(12) United States Patent
Di Gennaro et al.

(10) Patent No.: US 10,557,424 B2
(45) Date of Patent: *Feb. 11, 2020

(54) METHOD AND SYSTEM OF AIR CHARGING FOR AN INTERNAL COMBUSTION ENGINE

(71) Applicant: GM GLOBAL TECHNOLOGY OPERATIONS LLC, Detroit, MI (US)

(72) Inventors: Francesco Di Gennaro, Piemonte (IT); Giuseppe Conte, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 430 days.

This patent is subject to a terminal disclaimer.

(21) Appl. No.: 15/603,001

(22) Filed: May 23, 2017

(65) Prior Publication Data

US 2018/0340485 A1 Nov. 29, 2018

(51) Int. Cl.
  *B60T 7/12* (2006.01)
  *F02D 41/00* (2006.01)
  *F02B 37/24* (2006.01)
  *F02B 37/04* (2006.01)
  *F02D 41/14* (2006.01)

(52) U.S. Cl.
  CPC .......... *F02D 41/0072* (2013.01); *F02B 37/04* (2013.01); *F02B 37/24* (2013.01); *F02D 41/0007* (2013.01); *F02D 41/1401* (2013.01); *F02D 41/144* (2013.01); *F02D 2041/1427* (2013.01); *F02D 2041/1433* (2013.01); *F02D 2200/0402* (2013.01)

(58) Field of Classification Search
  CPC ............... F02D 41/007; F02D 41/0052; F02D 41/0077; F02D 41/18; F02D 41/26; F02B 37/22

USPC .......................................... 701/103, 108, 114
See application file for complete search history.

(56) References Cited

U.S. PATENT DOCUMENTS

| | | |
|---|---|---|
| 7,025,040 B2 | 4/2006 | Hoshino et al. |
| 7,031,824 B2 | 4/2006 | Gangopadhyay |
| 7,389,173 B1 | 6/2008 | Wang |
| 7,512,479 B1 | 3/2009 | Wang |

(Continued)

OTHER PUBLICATIONS

Thermodynamics—Basic Concepts—Durham College. Aug. 3, 2011. p. 2.

(Continued)

*Primary Examiner* — John Kwon
(74) *Attorney, Agent, or Firm* — Lorenz & Kopf, LLP

(57) ABSTRACT

Methods and systems are provided for controlling the operation of an air charging system of an internal combustion engine. A plurality of actuators include an electric motor of an air compressor. Output parameters of the air charging system are monitored by a plurality of sensors. An error between each one of the output parameters and a target value thereof is calculated by a processor. The calculated errors are applied to linear controllers that yield virtual inputs. Input parameters for the air charging system are calculated using the virtual inputs. The input parameters affect all of the output parameters. The input parameters are calculated with a non-linear mathematical model of the air charging system, configured such that each one of the virtual inputs is in a linear relation with only one of the output parameters. The actuators are operated using the input parameters.

16 Claims, 9 Drawing Sheets

(56) References Cited

U.S. PATENT DOCUMENTS

| | | |
|---|---|---|
| 7,784,451 B2 | 8/2010 | Chi |
| 8,108,123 B2 | 1/2012 | Sarlashkar et al. |
| 8,640,679 B2 | 2/2014 | Wang et al. |
| 2009/0007888 A1 | 1/2009 | Sarlashkar et al. |
| 2010/0292907 A1 | 11/2010 | Sarlashkar et al. |
| 2011/0041493 A1 | 2/2011 | Doering et al. |
| 2012/0291534 A1 | 11/2012 | Wang et al. |
| 2013/0074496 A1 | 3/2013 | Chi et al. |
| 2014/0060506 A1 | 3/2014 | Shaver |
| 2015/0345412 A1* | 12/2015 | Conte .................... F02M 26/05 701/102 |
| 2017/0101946 A1* | 4/2017 | Conte ................. F02D 41/0052 |

OTHER PUBLICATIONS

Jung, H., Jin, H., Choi, S., and Ko, M., "Modeling and Control of Single Turbocharger with High Pressure Exhaust Gas Recirculation Diesel Engine," SAE Technical Paper 2013-01-2649, 2013, doi:10.4271/2013-01-2649. http://papers.sae.org/2013-01-2649/.

* cited by examiner

METHOD AND SYSTEM OF AIR CHARGING FOR AN INTERNAL COMBUSTION ENGINE

TECHNICAL FIELD

The present disclosure generally relates to a method and system of air charging for an internal combustion engine, and more particularly relates to controlling the operation of an air charging system of an internal combustion engine, for instance an internal combustion engine of a motor vehicle.

BACKGROUND

An internal combustion engine may be equipped with an air charging system designed for supplying air into the combustion chambers. The air charging system generally includes an intake pipe that conveys air from the ambient environment to an intake manifold in fluid communication with the combustion chambers. An intake valve is generally disposed in the intake pipe. The intake valve has an actuator arranged to move a valve member that regulates the mass flow rate of the air that flows towards the intake manifold.

The air charging system may also comprise a turbocharger provided for increasing the pressure of the air in the intake manifold. The turbocharger comprises a compressor located in the intake pipe and a turbine that rotates the compressor by receiving exhaust gasses from an exhaust manifold in fluid communication with the combustion chambers. To regulate the rotational speed of the compressor, the turbine may be a variable geometry turbine (VGT) having an actuator arranged to alter the angular position of the turbine inlet vanes. The air charging system may comprise an additional air compressor located in the intake pipe and driven by an electric motor.

The air charging system may further comprise one or more exhaust gas recirculation (EGR) pipes for recirculating a portion of the exhaust gasses from the exhaust manifold back into the intake manifold. Each EGR pipe is generally provided with an EGR valve having an actuator arranged to move a valve member that regulates the mass flow rate of the recirculated exhaust gasses.

During the operation of the engine, the actuators of the air charging system, such as the EGR valve actuator(s), the VGT actuator, the intake valve actuator and the electric motor of the air compressor, are used to regulate a number of output parameters of the air charging system, for example the pressure inside the intake manifold, the oxygen concentration inside the intake manifold and the pressure inside the exhaust manifold, according to performance and emissions requirements.

To perform this function, these actuators are conventionally controlled according to separated and uncoordinated control strategies, which enable each individual actuator to be operated in any desired or required position, independently from one another.

Accordingly, it is desirable to provide improved control strategies for an air charging system. In addition, it is desirable to coordinate the control strategies of the actuators in the air charging system. Furthermore, other desirable features and characteristics of the present disclosure will become apparent from the subsequent detailed description and the appended claims, taken in conjunction with the accompanying drawings and the foregoing technical field and background.

SUMMARY

Methods and systems are provided for controlling the operation of an air charging system. In various embodiments a method is provided for controlling the operation of an air charging system of an internal combustion engine, wherein the air charging system comprises a plurality of actuators. The actuators include an electric motor of an air compressor. A plurality of output parameters of the air charging system are monitored by a plurality of sensors. An error between each one of the output parameters and a target value thereof is calculated by a processor. Each one of the calculated errors is applied to a linear controller that yields a virtual input. A plurality of input parameters for the air charging system are calculated using the virtual inputs, wherein each one of the input parameters affects all of the output parameters. The input parameters are calculated with a non-linear mathematical model of the air charging system that is configured such that each one of the virtual inputs is in a linear relation with only one of the output parameters. Each of the actuators of the air charging system is operated using a corresponding one of the input parameters.

In other embodiments, an air charging system of an internal combustion engine includes a plurality of actuators. One of the actuators is an electric motor of an air compressor. An electronic control unit includes a processor configured to monitor a plurality of output parameters of the air charging system. An error between each one of the monitored output parameters and a target value thereof is calculated by the processor. Each one of the calculated errors is applied to a linear controller that yields a virtual input. The virtual inputs are used by the processor to calculate a plurality of input parameters for the air charging system. The input parameters are calculated using a non-linear mathematical model of the air charging system configured such that each one of the virtual inputs is in a linear relation with only one of the output parameters. The processor uses each one of the input parameters to operate a corresponding one of the actuators of the air charging system.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the invention disclosed herein or the application and uses of the invention disclosed herein. Furthermore, there is no intention to be bound by any principle or theory, whether expressed or implied, presented in the preceding technical field, background, summary or the following detailed description, unless explicitly recited as claimed subject matter. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Exemplary embodiments described herein provide a system and method of controlling the operation of an air charging system of an internal combustion engine, wherein the air charging system comprises a plurality of actuators including an electric motor of air compressor. The effects generated on output parameters by the actuators of the air charging system are generally interdependent and have mutual interactions, so that separated and uncoordinated control strategies may not be optimal, especially during fast transients. Moreover, a separated and uncoordinated control approach requires a vast calibration activity, in some cases including hundreds of look-up tables. Accordingly, a control strategy of the air charging system with a coordinated and simultaneous adjustment of the actuators to compensate for their interactions as described herein provides a reliable control strategy that requires much less calibration effort. This control strategy provides for controlling the air charging system using a multi-input multi-output (MIMO) feedback linearization approach, which has the effect of allowing a simultaneous and coordinated control of the actuators while compensating for their interactions. This coordinated control strategy has good transient response and accuracy and improves the trade-off between engine performance and emissions under any operating conditions. Through use of a mathematical model of the air charging system, a coordinated control strategy has the additional effect of reducing the calibration efforts.

Figure 1:
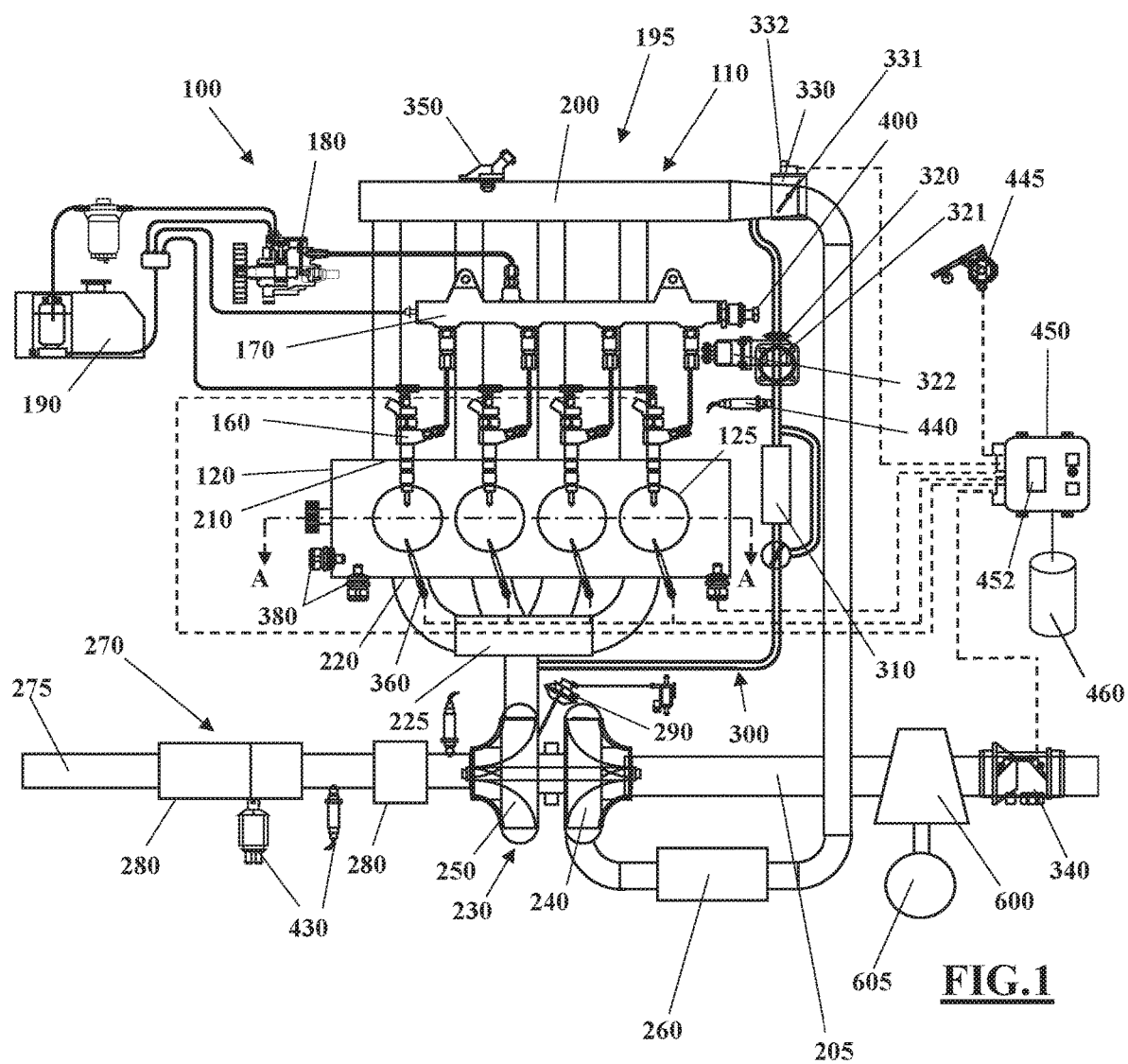
FIG. 1 schematically shows an automotive system according to a first embodiment of the disclosure.
Figure 2:
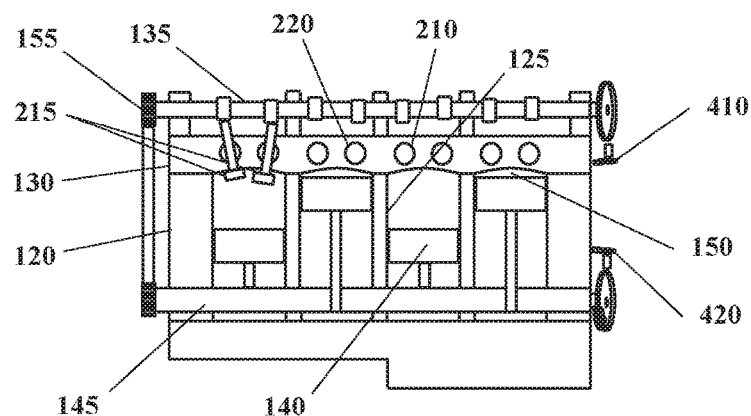
FIG. 2 is section A-A of FIG. 1.

Some embodiments may include an automotive system 100, as shown in FIGS. 1 and 2, that includes an internal combustion engine (ICE) 110, for example a compression-ignition engine (e.g. Diesel) or a spark-ignition engine (e.g. gasoline). The ICE 110 has an engine block 120 defining at least one cylinder 125 having a piston 140 coupled to rotate a crankshaft 145. A cylinder head 130 cooperates with the piston 140 to define a combustion chamber 150. A fuel and air mixture is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through an exhaust port 220. In some examples, a cam phaser 155 may selectively vary the timing between the camshaft 135 and the crankshaft 145.

The exhaust gasses coming from the combustion chamber 150 are directed into an exhaust system 270. The exhaust system 270 may include an exhaust manifold 225 in fluid communication with the exhaust port(s) 220, which collects the exhaust gasses and directs them into and exhaust pipe 275 having one or more exhaust aftertreatment devices 280.

The aftertreatment devices 280 may be any device configured to change the composition of the exhaust gases. Some examples of aftertreatment devices 280 include, but are not limited to, catalytic converters (two and three ways), oxidation catalysts, lean NOx traps, hydrocarbon adsorbers, selective catalytic reduction (SCR) systems, and particulate filters.

The air may be provided to the air intake port(s) 210 through an air charging system 195. The air charging system 195 may comprise an intake manifold 200 in communication with the air intake port(s) 210. An air intake duct 205 may provide air from the ambient environment to the intake manifold 200. An intake valve 330 may be disposed in the intake duct 205. The intake valve 330 may comprise a movable valve member 331, for example a throttle body, and an electrical actuator 332 that moves the valve member 331 to regulate the mass flow rate of the air directed into the manifold 200.

The air charging system 195 may also comprise a variable-geometry turbocharger 230, having a compressor 240 rotationally coupled to a turbine 250, wherein the compressor is located in the intake duct 205 and the turbine in the exhaust pipe 275. Rotation of the compressor 240 increases the pressure and temperature of the air in the intake duct 205 and manifold 200. An intercooler 260, disposed in the intake duct 205 between the compressor 240 and the intake manifold 200, may reduce the temperature of the air. The turbine 250 rotates by receiving exhaust gases from the exhaust manifold 225 that directs exhaust gases from the exhaust ports 220 and through a series of vanes prior to expansion through the turbine 250. This example shows a variable geometry turbine (VGT) with a VGT actuator 290 arranged to move the vanes of the turbine 250 to alter the flow of the exhaust gases through it.

The air charging system 195 may further include an exhaust gas recirculation (EGR) system for recirculating part of the exhaust gasses back into the combustion chambers 150. The EGR system may comprise a high-pressure EGR (HP-EGR) pipe 300 coupled between the exhaust manifold 225 and the intake manifold 200. More specifically, the HP-EGR pipe 300 branches from the exhaust manifold 225, or from a point of the exhaust pipe 275 located upstream of the turbine 250, and leads to a point of the intake duct 205 located downstream of the compressor 240, such as between the intake manifold 200 and the intake valve 330. The HP-EGR pipe 300 may be provided with an HP-EGR cooler 310 to reduce the temperature of the exhaust gases flowing therein. An HP-EGR valve 320 may be disposed in the HP-EGR pipe 300. The HP-EGR valve 320 may comprise a movable valve member 321 and an electrical actuator 322 that moves the valve member 321 to regulate a mass flow rate of the exhaust gases in the HP-EGR pipe 300.

Figure 4:
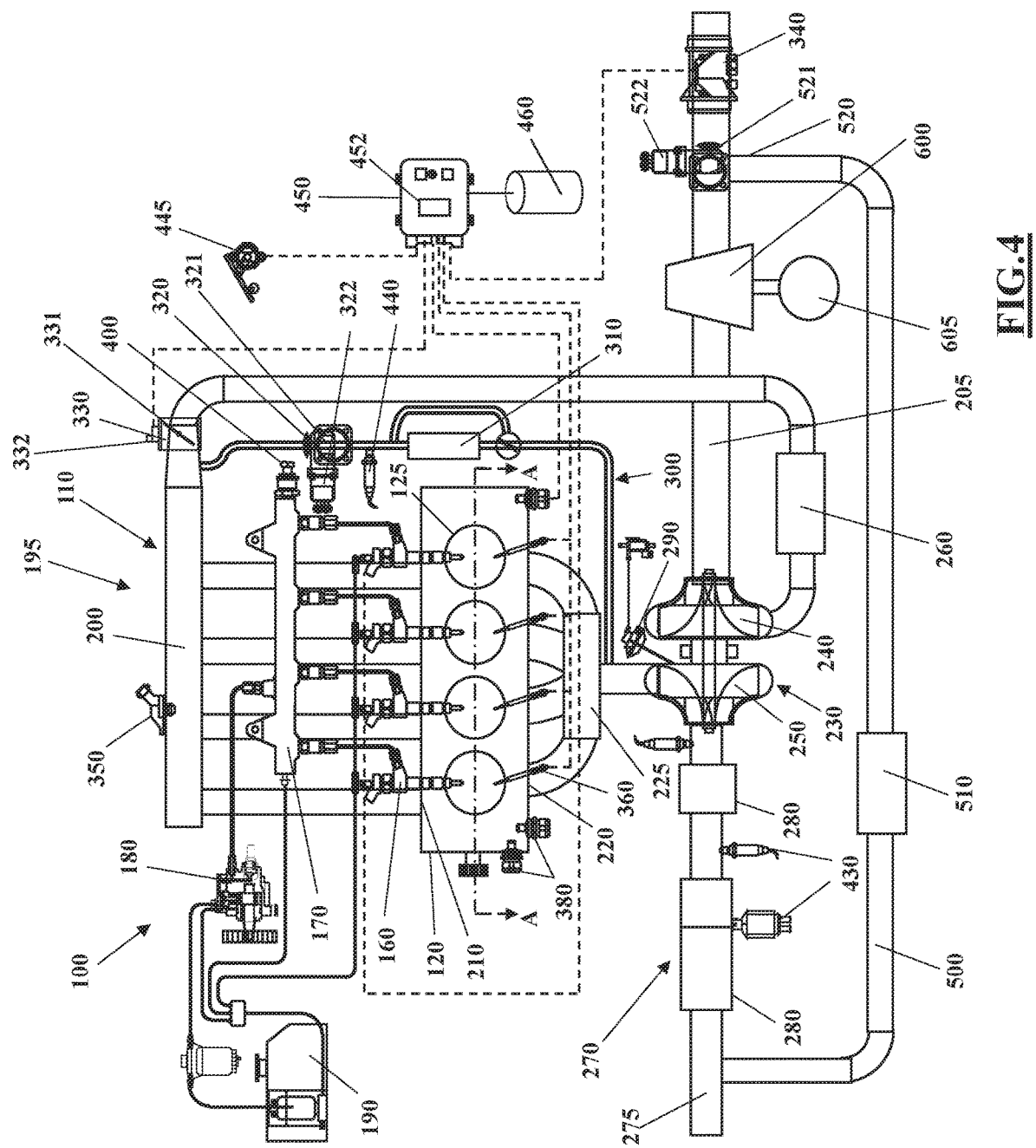
FIG. 4 schematically shows an automotive system according to a third embodiment of the disclosure.
Figure 5:
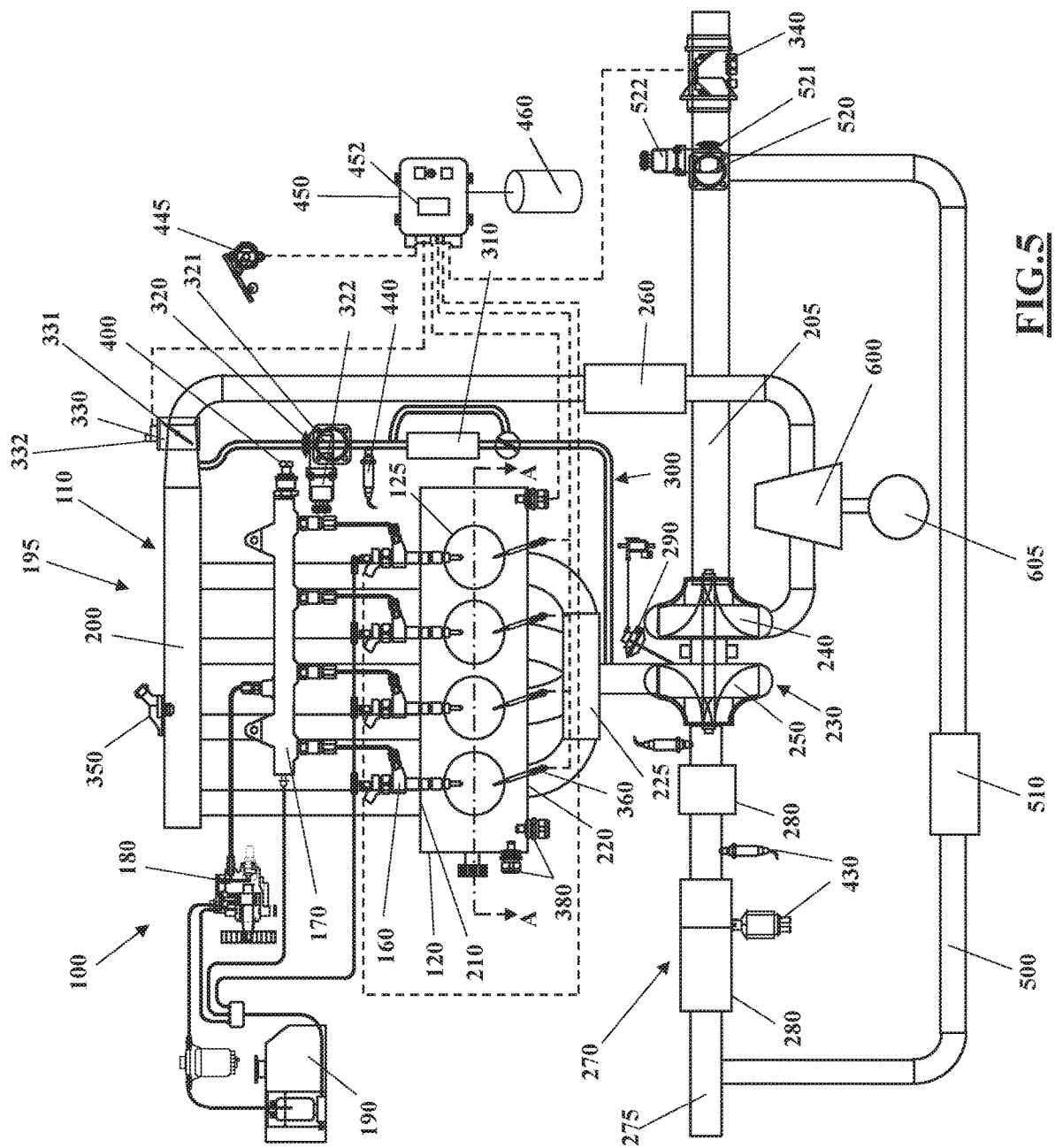
FIG. 5 schematically shows an automotive system according to a fourth embodiment of the disclosure.

In some embodiments, as shown in FIGS. 4 and 5, the EGR system may further comprise a low-pressure EGR (LP-EGR) pipe 500 coupled between the exhaust manifold 225 and the intake manifold 200. More specifically, the LP-EGR pipe 500 branches from a point of the exhaust pipe 275 located downstream of the turbine 250, such as downstream of the aftertreatment devices 280, and leads to a point of the intake duct 205 located upstream of the compressor 240. The LP-EGR pipe 500 may be provided with a LP-EGR cooler 510 to reduce the temperature of the exhaust gases flowing therein. A LP-EGR valve 520 may be disposed in the LP-EGR pipe 500. The LP-EGR valve 520 may comprise a movable valve member 521 and an electrical actuator 522 that moves the valve member 521 to regulate a mass flow rate of the exhaust gases in the LP-EGR pipe 500.

Figure 3:
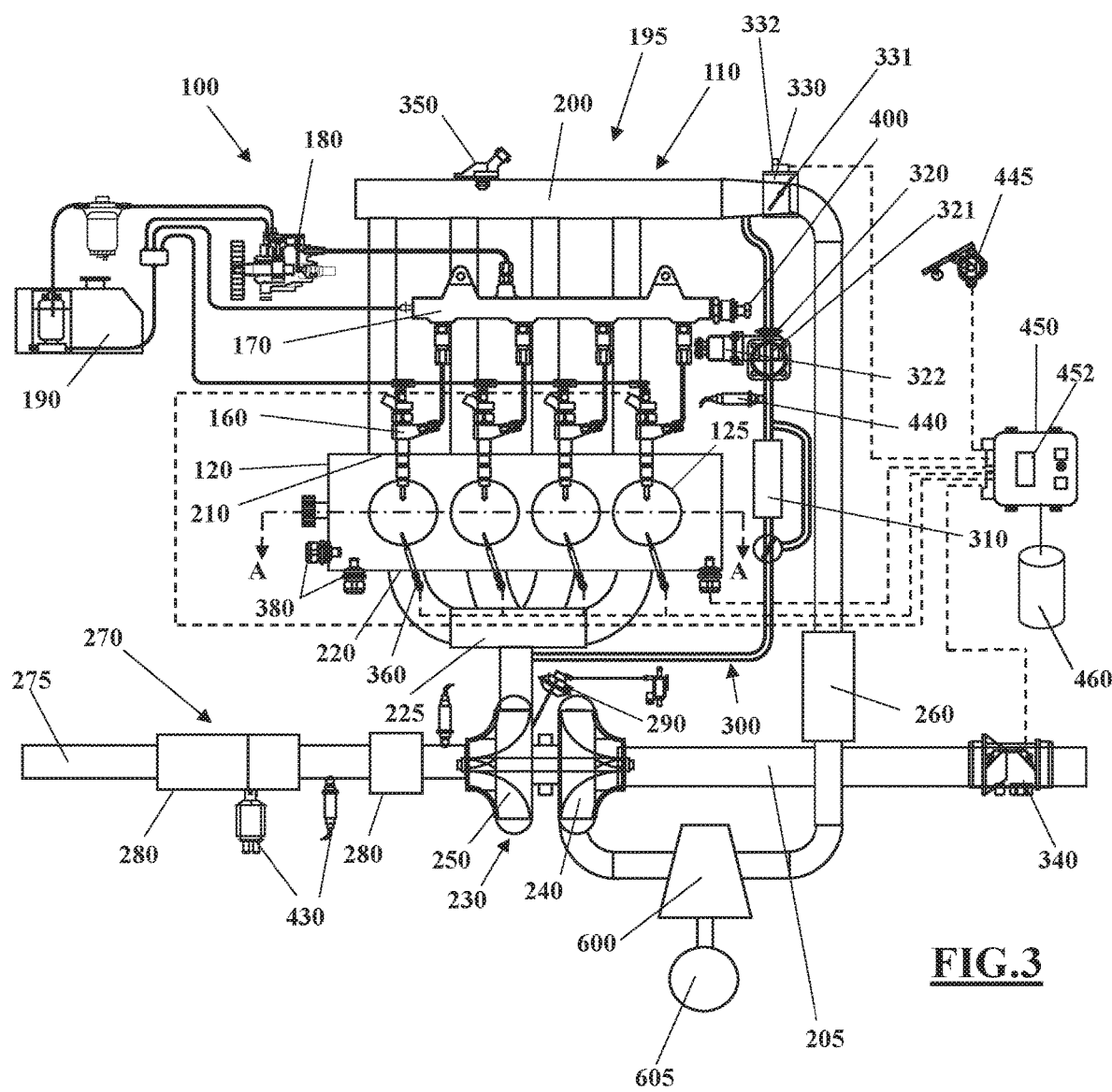
FIG. 3 schematically shows an automotive system according to a second embodiment of the disclosure.

The air charging system 195 may further include an additional air compressor 600, also referred as to electric compressor or simply e-compressor, which is driven by a dedicated electric motor 605. The air compressor 600 may be located in the intake duct 205 upstream or downstream of the compressor 240 of the turbocharger 230. In particular, for the embodiments that do not include the low-pressure EGR pipe 500, the air compressor 600 may be located between the compressor 240 and the mass airflow and temperature sensor 340, as shown in FIG. 1, or it may be located between the compressor 240 and the intercooler 260, as shown in FIG. 3. For the embodiments that include the low-pressure EGR pipe 500, the air compressor 600 may be located between the compressor 240 and the LP-EGR valve 520, as shown in FIG. 4, or it may be located between the compressor 240 and the intercooler 260, as shown in FIG. 5.

The automotive system 100 may further include an electronic control unit (ECU) 450 in communication with one or more sensors and/or devices associated with the ICE 110. The ECU 450 and specifically, its processor 452 may receive input signals from various sensors configured to generate the signals in proportion to various physical parameters associated with the ICE 110. The sensors include, but are not limited to, a mass airflow and temperature sensor 340, located in the intake duct 205 upstream of the LP-EGR valve 520 in the embodiments of FIGS. 4 and 5, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an HP-EGR temperature sensor 440, and an accelerator pedal position sensor 445. Furthermore, the ECU 450, by the processor 452, may generate output signals delivered to various control devices that are arranged to control the operation of the ICE 110, including, but not limited to, the fuel injectors 160, the intake valve actuator 332, the HP-EGR Valve actuator 322, the LP-EGR valve actuator 522, the VGT actuator 290, the electric motor 605 and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system and an interface bus. The CPU is embodied as processor 452 and is configured to execute instructions stored as a program in the memory system 460, and send and receive signals to/from the interface bus. The memory system 460 may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout out the steps of such methods and control the ICE 110. The methods are carried out with the help of a computer program or programs comprising program-code residing in the processor 452, or in a number of processors, for carrying out all the steps of the method described herein, and in the form of a computer program product comprising the computer program. The method may also be embodied as an electromagnetic signal, the signal being modulated to carry a sequence of data bits which represent a computer program to carry out all steps of the methods.

The program stored in the memory system 460 is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as quadrature phase shift keying (QPSK) for digital data, such that binary data representing the computer program code is impressed on the transitory electromagnetic signal. Such signals are e.g. made use of when transmitting computer program code in a wireless fashion via a Wi-Fi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an ASIC, a CD or the like.

Instead of an ECU 450, the automotive system 100 may have a different type of processor to provide the electronic logic, e.g. an embedded controller, an on-board computer, or any processing module that might be deployed in the vehicle.

In greater details, the ECU 450 may be configured to control the actuators of the air charging system 195 using a feedback linearization approach, which may be based on a multi-input-multi-output (MIMO) non-linear mathematical model of the air charging system 195. By way of example, assuming that the EGR system comprises only one EGR pipe, for instance only the HP-EGR pipe 300, as shown in FIGS. 1 and 3, the actuators of the air charging system 195 comprise the intake valve actuator 332, the HP-EGR valve actuator 322, the VGT actuator 290 and the electric motor 605 of the additional air compressor 600.

Considering the case of FIG. 1, where the air compressor 600 is located upstream of the compressor 240 of the turbocharger 230, the input parameters of the air charging system 195 may include a parameter $W_{itv}$ indicative of the air mass flow rate through the intake valve 330, a parameter $W_{egr}$ indicative of the exhaust mass flow rate through the HP-EGR valve 320, a parameter $W_{vgt}$ indicative of the exhaust mass flow rate through the turbine 250 of the variable-geometry turbocharger 230 and a parameter $P_e$ indicative of an electric power provided to the electric motor 605 of the air compressor 600.

In this case, the output parameters of the air charging system 195 may include a parameter $p_x$ indicative of an exhaust gas pressure within the exhaust manifold 225, a parameter $p_i$ indicative of an intake manifold pressure, a parameter $F_i$ indicative of a residual gas fraction in the intake manifold 200 and a parameter $p_{ec}$ indicative of an air pressure downstream of the air compressor 600, such as between the air compressor 600 and the compressor 240 of the turbocharger 230.

The MIMO non-linear mathematical model of the air charging system 195 may be defined by the following equations:

$$\dot{p}_i = \frac{dp_i}{dt} = \frac{\gamma R}{V_i}(W_{itv}T_{ic} + W_{egr}T_{egr} - W_{ei}T_i)$$

$$\dot{p}_x = \frac{dp_x}{dt} = \frac{\gamma R}{V_x}(W_{ex}T_{eout} - W_{egr}T_x - W_{vgt}T_x)$$

$$\dot{F}_i = \frac{dF_i}{dt} = \frac{(F_x - F_i)W_{egr} - F_i W_{itv}}{m_i}$$

$$\dot{p}_{ec} = \frac{dp_{ec}}{dt} = p_{ec\_us} \cdot c \cdot (P_e - c_p \cdot W_c \cdot T_{c\_ds} \cdot R_{ec})$$

wherein $\gamma$ is the ratio of specific heats, R is the universal gas constant, $V_i$ is an intake manifold inner volume, $T_{ic}$ is an air temperature in the intake duct 205 downstream of the intercooler 260, $T_i$ is an air temperature within the intake manifold 200, $T_{egr}$ is a recirculated exhaust gas temperature, $T_x$ is an exhaust gas temperature within the exhaust manifold 225, $T_{eout}$ is a temperature of the exhaust gas exiting the ICE 110, $V_x$ is an exhaust manifold volume, $F_x$ is a residual gas fraction within the exhaust manifold 225, $m_i$ is the overall mass of gasses within the intake manifold 200, $W_{ei}$ is the overall mass flow rate of gasses entering the engine 110, $W_{ex}$ is the overall mass flow rate of gasses exiting the engine 110, $p_{ec\_us}$ is the air pressure upstream of the air compressor 600, c is a constant related to the turbocharger inertia, $P_e$ is the electrical power provided to the electric motor 605 of the air compressor 600, $c_p$ is a specific heat capacity of the air at constant pressure, $W_c$ is the overall mass flow rate of air through the compressor 240, $T_{c\_ds}$ is the air temperature downstream of the compressor 240, such as between the compressor 240 an the intercooler 260, and $R_{ec}$ is a power rate of the air compressor 260.

In should be observed that $R_{ec}$ may be a function of the following parameters:

$$R_{ec} = f\left(\frac{W_c\sqrt{(T_{c\_ds}/)T_{ref}}}{p_{c\_ds}}, \beta_{ec}\right)$$

wherein $T_{ref}$ is reference temperature used correct compressor maps, $p_{c\_ds}$ is the air pressure downstream of the compressor 240, such as between the compressor 240 the intercooler 260, and $\beta_{ec}$ is the compression rate caused by the air compressor 600, namely the ratio between the air pressure upstream and downstream of the air compressor 600.

The MIMO non-linear mathematical model of the air charging system 195 may be equally defined by the following matrix equation:

$$\begin{bmatrix} \dot{p}_i \\ \dot{p}_x \\ \dot{F}_i \\ \dot{p}_{ec} \end{bmatrix} = \begin{bmatrix} \frac{\gamma R}{V_i}(W_{itv}T_{ic} + W_{egr}T_{egr} - W_{ei}T_i) \\ \frac{\gamma R}{V_x}(W_{ex}T_{eout} - W_{egr}T_x - W_{vgt}T_x) \\ \frac{(F_x - F_i)W_{egr} - F_i W_{itv}}{m_i} \\ p_{ec\_us} \cdot c \cdot (P_e - c_p \cdot W_c \cdot T_{c\_ds} \cdot R_{ec}) \end{bmatrix} =$$

$$\begin{bmatrix} -\frac{\gamma R}{V_i}T_i W_{ei} \\ \frac{\gamma R}{V_x}T_{eout}W_{ex} \\ 0 \\ -p_{ec\_us} \cdot c \cdot c_p \cdot W_c \cdot T_{c\_ds} \cdot R_{ec} \end{bmatrix} +$$

$$\begin{bmatrix} \frac{\gamma R}{V_i}T_{ic} & \frac{\gamma R}{V_i}T_{egr} & 0 & 0 \\ 0 & 0-\frac{\gamma R}{V_x}T_x & -\frac{\gamma R}{V_x}T_x & 0 \\ -\frac{F_i}{m_i} & -\frac{F_i}{m_i} & 0 & 0 \\ 0 & 0 & 0 & p_{ec\_us} \cdot c \end{bmatrix} \cdot \begin{bmatrix} W_{itv} \\ W_{egr} \\ W_{vgt} \\ P_e \end{bmatrix}.$$

defining an output vector y as:

$$y = \begin{bmatrix} p_i \\ p_x \\ F_i \\ p_{ec} \end{bmatrix}$$

an input vector u as:

$$u = \begin{bmatrix} W_{itv} \\ W_{egr} \\ W_{vgt} \\ P_e \end{bmatrix}$$

a first vector Cf(x) of functions as:

$$Cf(x) = \begin{bmatrix} -\frac{\gamma R}{V_i}T_i W_{ei} \\ \frac{\gamma R}{V_x}T_{eout}W_{ex} \\ 0 \\ -p_{ec\_us} \cdot c \cdot c_p \cdot W_c \cdot T_{c\_ds} \cdot R_{ec} \end{bmatrix}$$

and a matrix Gg(x) of functions as:

$$Gg(x) = \begin{bmatrix} \frac{\gamma R}{V_i}T_{ic} & \frac{\gamma R}{V_i}T_{egr} & 0 & 0 \\ 0 & 0-\frac{\gamma R}{V_x}T_x & -\frac{\gamma R}{V_x}T_x & 0 \\ -\frac{F_i}{m_i} & -\frac{F_i}{m_i} & 0 & 0 \\ 0 & 0 & 0 & p_{ec\_us} \cdot c \end{bmatrix}$$

the matrix equation above may be rewritten as follows:

$$\dot{y} = Gg(x) \cdot u + Cf(x)$$

where x generically indicates a vector of state variables of the air charging system 195. As a consequence, it is possible to define a vector v of virtual inputs:

$$v = \begin{bmatrix} v_1 \\ v_2 \\ v_3 \\ v_4 \end{bmatrix}$$

and use this virtual input vector v to develop a feedback linearization control algorithm u(x,v) according to the following matrix equation:

$$u(x,v) = Gg(x)^{-1} \cdot (v - Cf(x))$$

such that:

$$\dot{y} = v$$

The MIMO non-linear mathematical system has been transformed in an equivalent linear system, where each one of the virtual inputs $v_1$, $v_2$, $v_3$ and $v_4$ is related to only one of the output parameters $\dot{p}_i$, $\dot{p}_x$, $\dot{F}_i$ and $\dot{p}_{ec}$ and vice versa, and where the relation between each one of the virtual inputs and the respective output parameter is a linear relation.

Figure 6:
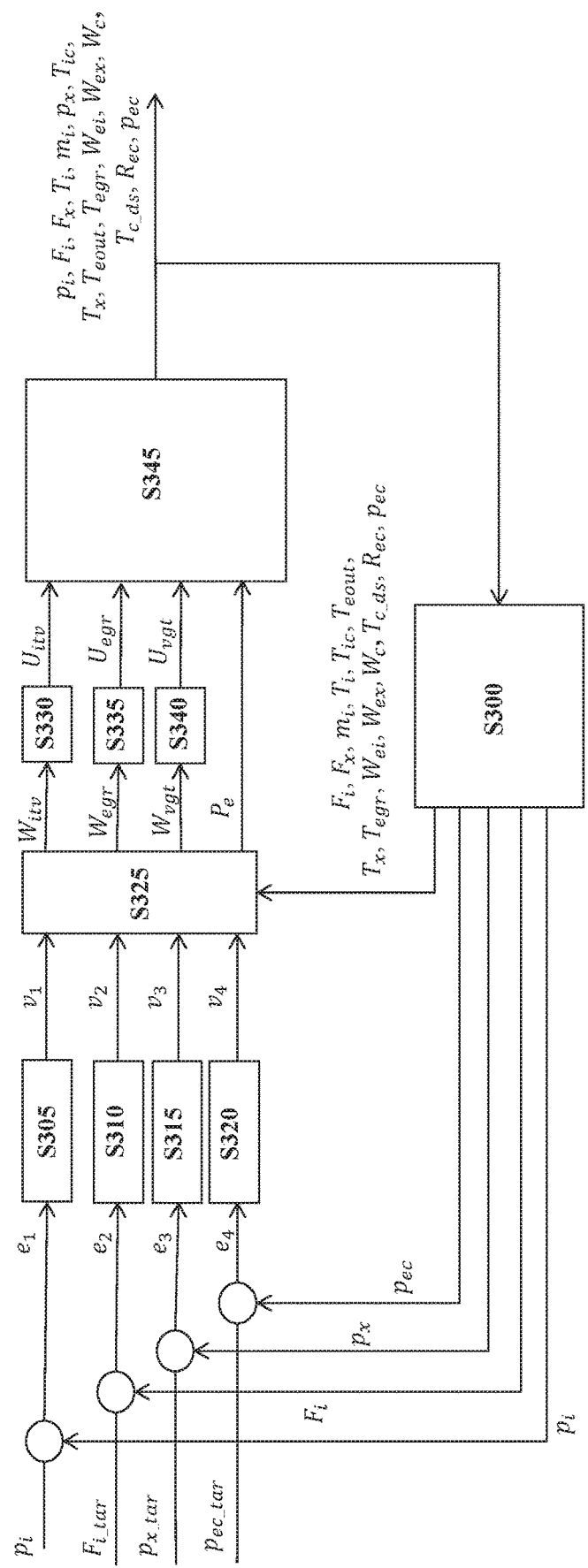
FIG. 6 schematically shows an example of an air charging multivariable nonlinear control system of the automotive system of FIG. 1 using feedback linearization control.

Taking advantage of this transformation, the ECU 450 may be configured so that the processor 452 controls the intake valve actuator 332, the EGR valve actuator 322, the VGT actuator 290 and the electric motor 605 of the air compressor 600 during the operation of the ICE 110, by the linear control procedure illustrated in FIG. 6. This provides an implementation of the control strategy when the above identified actuators are involved and when the air compressor 600 is disposed in the intake duct 205 upstream of the compressor 240 of the variable-geometry turbocharger 230.

This control procedure provides for the ECU 450, by the processor 452, to monitor (module S300) and receive data on the value of the output parameters of the air charging system 195, namely the exhaust manifold pressure $p_x$, the intake manifold pressure $p_i$, the residual gas fraction $F_i$ in the intake manifold 200 and the air pressure $p_{ec}$ upstream of the air compressor 600, along with the value of the other observable state variables of the system involved in the MIMO non-linear mathematical model above, namely the intake manifold air temperature $T_i$, the air temperature $T_{ic}$ in the intake duct 205 downstream of the intercooler 260, the recirculated exhaust gas temperature $T_{egr}$, the exhaust manifold gas temperature $T_x$, the engine out exhaust gas temperature $T_{eout}$, the residual gas fraction $F_x$ in the exhaust manifold 225, the overall mass $m_i$ at the intake manifold 200, the overall mass flow rate $W_{ei}$ entering the engine 110, the overall mass flow rate $W_{ex}$ exiting the engine 110, the overall mass flow rate $W_c$ of air through the compressor 240, the air temperature $T_{c\_ds}$ downstream of the compressor 240 and the power rate $R_{ec}$ of the air compressor 260.

In this regard, the value of the exhaust manifold pressure $p_x$ may be measured by a pressure sensor that may be disposed in the exhaust manifold 225 or in the exhaust pipe 275 upstream of the turbine 250. As an alternative, this pressure value may be estimated on the basis of other measurable operating parameters of the ICE 110, for example on the basis of the measurements made by the exhaust pressure and temperature sensors 430. The value of intake manifold pressure $p_i$ may be measured by the manifold pressure and temperature sensor 350 located in the intake manifold 200. The value of the residual gas fraction $F_i$ may be calculated as a function of the value of an oxygen concentration $O_2$ within the intake manifold 200, according to the equation $F_i = 1 - O_2$. The oxygen concentration value $O_2$ may be measured by a dedicated sensor disposed in the intake manifold 200 or may be estimated on the basis of other measurable operating parameters of the ICE 110. The value of the intake manifold air temperature $T_i$ may be measured by the manifold pressure and temperature sensor 350 located in the intake manifold 200. The value of intake manifold air temperature downstream of the intercooler $T_{ic}$ may be measured by a dedicated sensor or estimated on the basis of the measurements made by the manifold pressure and temperature sensor 350. The value of the recirculated exhaust gas temperature $T_{egr}$ may be measured by the HP-EGR temperature sensor 440. The value of the exhaust manifold gas temperature $T_x$ may be measured by a temperature sensor that may be disposed in the exhaust manifold 225 or in the exhaust pipe 275 upstream of the turbine 250. As an alternative, this temperature value may be estimated on the basis of other measurable operating parameters of the ICE 110, for example on the basis of the measurements made by the exhaust pressure and temperature sensors 430. The value of the engine out exhaust gas temperature $T_{eout}$ may be determined by a dedicated sensor or estimated on the basis of other measurable operating parameters of the ICE 110. The value of the residual gas fraction $F_x$ at the exhaust manifold 225 may be measured by a lambda sensor located in the exhaust pipe 275, upstream of the aftertreatment devices 280. The value of the overall mass $m_i$ at the intake manifold 200, the value of the overall mass flow rate $W_{ei}$ entering the engine 110 and the value of the overall mass flow rate $W_{ex}$ exiting the engine 110, may be measured or estimated with the aid of the mass airflow and temperature sensor 340. The overall mass flow rate $W_c$ of air through the compressor 240 may be calculated starting from the measure air mass flow rate plus an estimation of the LP EGR flow. The air temperature $T_{c\_ds}$ downstream of the compressor 240 may be measured with a dedicated sensor or estimated. The power rate $R_{ec}$ of the air compressor 260 may be calculated with the above-mentioned formula, wherein the air pressure $p_{c\_ds}$ downstream of the compressor 240 may be measured with a pressure sensor and $\beta_{ec}$ may be determined as the ratio between $p_{itv\_us}$ and $p_{c\_ds}$ The monitored values of the output parameters $p_i$, $F_i$, $p_x$ and $p_{ec}$ are fed back and used to calculate an error (i.e. a difference) $e_1$, $e_2$, $e_3$ and $e_4$ between each one of them and a corresponding target value $p_{i\_tar}$, $F_{i\_tar}$, $p_{x\_tar}$ and $p_{ec\_tar}$ thereof:

$$e_1 = p_{i\_tar} - p_i$$

$$e_2 = F_{i\_tar} - F_i$$

$$e_3 = p_{x\_tar} - p_x$$

$$e_3 = p_{ec\_tar} - p_{ec}$$

The target values $p_{i\_tar}$, $p_{x\_tar}$, $p_{ec\_tar}$ and $F_{i\_tar}$ for the output parameters may be determined via the ECU 450 by the processor 452 on the basis of other conventional strategies, for example on the basis of the engine operating point.

The first error $e_1$ is then applied as input to a first single-input single-output (SISO) linear controller S305 that yields as output a corresponding value for the first virtual input $v_1$. The second error $e_2$ is applied as input to a second SISO linear controller S310 that yields as output a corresponding value for the second virtual input $v_2$. The third error $e_3$ is applied as input to a third SISO linear controller S315 that yields as output a corresponding value for the third virtual input $v_3$. The fourth error $e_4$ is applied as input to a fourth SISO linear controller S320 that yields as output a corresponding value for the fourth virtual input $v_4$.

The four linear controller S305, S310, S315 and S320 may be for example proportional-integral (PI) controllers or proportional-integral-derivative (PID) controllers, and are tuned over the equivalent linear system explained above, such as to minimize the respective errors $e_1$, $e_2$, $e_3$ and $e_4$. This aspect has the effect of simplifying the linear control loop within the feedback linearization approach.

The values of the virtual inputs $v_1$, $v_2$, $v_3$ and $v_4$ are then applied to a non-linear calculation module S325, where they are used to calculate corresponding values of the input parameters $W_{itv}$, $W_{egr}$, $W_{vgt}$ and $P_e$ of the air charging system 195. In particular, the calculation module S320 may calculate the values of these input parameters with the feedback linearization control algorithm that have been previously explained:

$$u = \begin{bmatrix} W_{itv} \\ W_{egr} \\ W_{vgt} \\ P_e \end{bmatrix} = Gg(x)^{-1} \cdot (v - Cf(x))$$

The calculated value of the air mass flow rate $W_{itv}$ is then applied to a calculation module S330, which may use a mathematical model of the intake valve 330 to yield as output a position $U_{itv}$ of the actuator 332, which corresponds to the calculated value of the air mass flow rate $W_{itv}$. The calculated value of the exhaust mass flow rate $W_{egr}$ is applied to another calculation module S335, which may use a mathematical model of the HP-EGR valve 320 to yield as output a position $U_{egr}$ of the actuator 322, which corresponds to the calculated value of the exhaust mass flow rate $W_{egr}$. The calculated value of the exhaust mass flow rate $W_{vgt}$ is applied to still another calculation module S340, which may use a mathematical model of the turbine 250 to yield as output a position $U_{vgt}$ of the actuator 290, which corresponds to the calculated value of the exhaust mass flow rate $W_{vgt}$.

The air intake valve actuator 332, the EGR valve actuator 322 and the VGT actuator 290 are operated according to the respective calculated position $U_{itv}$, $U_{egr}$ and $U_{vgt}$ while the electric motor 605 of the air compressor 600 is operated according to the calculated value $P_e$ of the electrical power (actuator operating module S345).

Figure 7:
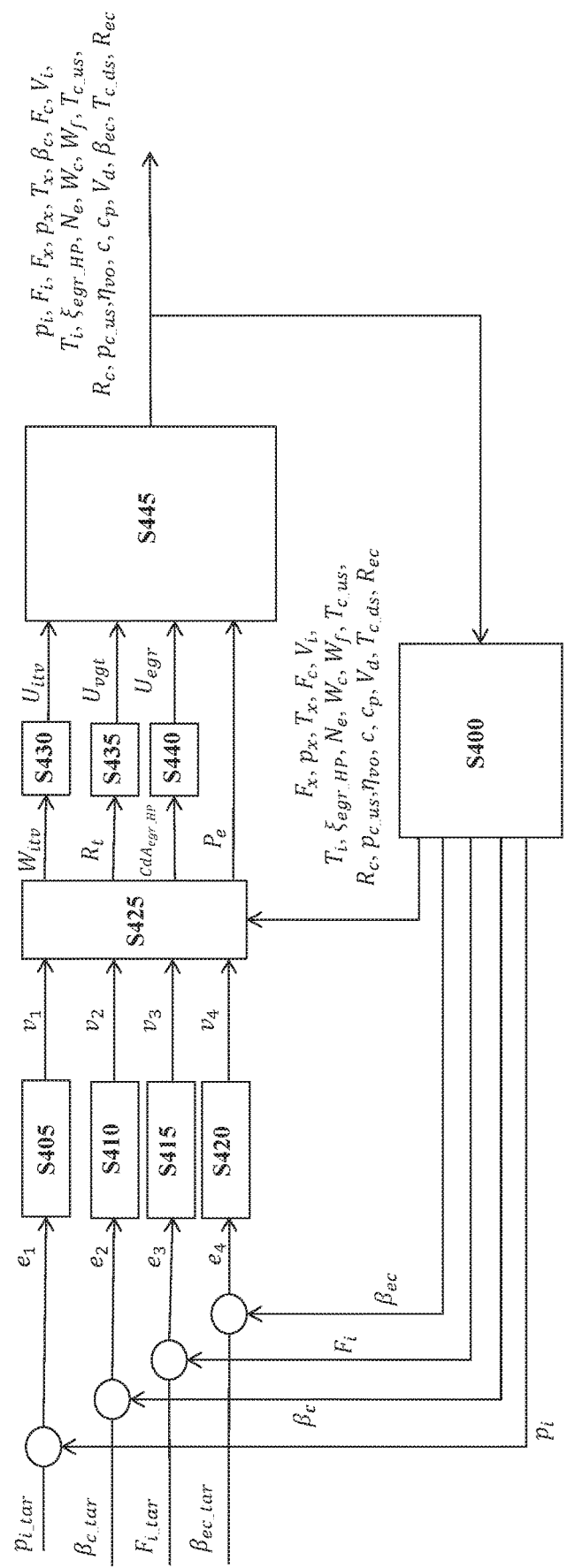
FIG. 7 schematically shows an example of an air charging multivariable nonlinear control system of the automotive system of FIG. 3 using feedback linearization control.

With reference to FIG. 7, for the embodiment of FIG. 3 where the air compressor 600 is located downstream of the compressor 240 of the turbocharger 230, the input parameters of the air charging system 195 may include a parameter $W_{itv}$ indicative of the air mass flow rate through the intake valve 330, a parameter $R_t$ indicative of a power rate of the turbine 250, a parameter $CdA_{egr\_HP}$ indicative of a flow effective area of the HP-EGR valve 320 and a parameter $P_e$ indicative of an electric power provided to the electric motor 605 of the air compressor 600.

In this case, the output parameters of the air charging system 195 may include a parameter $p_i$ indicative of an intake manifold pressure, a parameter $\beta_c$ indicative of a compression rate caused by the compressor 240 of the turbocharger 230 (namely the ratio between the air pressure upstream and downstream of the compressor 240), a parameter $F_i$ indicative of a residual gas fraction in the intake manifold 200 and a parameter $\beta_{ec}$ indicative of the compression rate caused by the air compressor 600 (namely the ratio between the air pressure upstream and downstream of the air compressor 600).

The MIMO non-linear mathematical model of the air charging system 195 may be defined by the following equations:

$$\dot{p}_i = \frac{dp_i}{dt} = \frac{RT_i}{V_i}\left(W_{itv} + \frac{p_x \xi_{egr\_HP}}{\sqrt{RT_x}} CdA_{egr\_HP} - \eta_{v0}\frac{V_d N_e}{120 RT_i} p_i\right)$$

$$\dot{\beta}_c = \frac{d\beta_c}{dt} = c \cdot (c_p \cdot (W_c + W_f) \cdot T_x \cdot R_t - c_p \cdot W_c \cdot T_{c\_us} \cdot R_c)$$

$$\dot{F}_i = \frac{dF_i}{dt} = \frac{RT_i}{p_i V_i}\left(\frac{p_x \xi_{egr\_HP}}{\sqrt{RT_x}} CdA_{egr\_HP}(F_x - F_i) + W_{itv}(F_c - F_i)\right)$$

$$\dot{\beta}_{ec} = \frac{d\beta_{ec}}{dt} = c \cdot (P_e - c_p \cdot W_c \cdot T_{c\_ds} \cdot R_{ec})$$

wherein R is the universal gas constant, $V_i$ is an intake manifold inner volume, $T_i$ is an air temperature within the intake manifold 200, $p_x$ is an exhaust gas pressure within the exhaust manifold 225, $\xi_{egr\_HP}$ is an HP-EGR correction factor, $T_x$ is an exhaust gas temperature within the exhaust manifold 225, $\eta_{v0}$ is a volumetric efficiency of the engine, $V_d$ is a displacement of the engine, $N_e$ is an engine rotational speed, $p_i$ is an intake manifold pressure, c is a constant related to the turbocharger inertia, $c_p$ is a specific heat capacity of a gas at constant pressure, $W_c$ is a mass flow rate of the air/gas flow through the compressor 240 of the turbocharger 230, $W_f$ is a mass flow rate of fuel injected into the combustion chambers 150 of the engine 110, $T_{c\_us}$ is a temperature of the air/gas flow in the intake duct 205 upstream of the compressor 240, $R_c$ is a power rate of the compressor 240, $F_x$ is a residual gas fraction within the exhaust manifold 225, $F_c$ is a residual gas fraction in the intake duct 205 upstream of the compressor 240 of the turbocharger 230, $T_{c\_ds}$ is the air temperature downstream of the compressor 240, such as between the compressor 240 and the air compressor 600, and $R_{ec}$ is a power rate of the air compressor 600.

It should be observed that $R_{ec}$ may be a function of the following parameters:

$$R_{ec} = f\left(\frac{W_c\sqrt{(T_{c\_ds}/)T_{ref}}}{p_{c\_ds}}, \beta_{ec}\right)$$

wherein $T_{ref}$ is the reference temperature used to correct the compressor maps, $p_{c\_ds}$ is the air pressure downstream of the compressor 240, such as between the compressor 240 the air compressor 600, and $\beta_{ec}$ is the compression rate caused by the air compressor 600, namely the ratio between the air pressure upstream and downstream of the air compressor 600. Similarly, $R_c$ may be a function of the following parameters:

$$R_c = f\left(\frac{W_c\sqrt{(T_{c\_us}/)R}}{p_{c\_us}}, \beta_c\right)$$

wherein $p_{c\_us}$ is the air pressure upstream of the compressor 240 of the turbocharger 230, such as between the compressor 240 and the mass air flow and temperature sensor 340.

The MIMO non-linear mathematical model of the air charging system 195 may be equally defined by the following matrix equation:

$$\begin{bmatrix} \dot{p}_i \\ \dot{\beta}_c \\ \dot{F}_i \\ \dot{\beta}_{ec} \end{bmatrix} = \begin{bmatrix} \frac{RT_i}{V_i}\left(W_{itv} + \frac{p_x \xi_{egr_{HP}}}{\sqrt{RT_x}} CdA_{egr_{HP}} - \eta_{v0}\frac{V_d N_e}{120 RT_i}p_i\right) \\ c \cdot (c_p \cdot (W_c + W_f) \cdot T_x \cdot R_t - c_p \cdot W_c \cdot T_{c_{us}} \cdot R_c) \\ \frac{RT_i}{p_i V_i}\left(\frac{p_x \xi_{egr_{HP}}}{\sqrt{RT_x}} CdA_{egr_{HP}}(F_x - F_i) + W_{itv}(F_c - F_i)\right) \\ c \cdot (P_e - c_p \cdot W_c \cdot T_{c_{ds}} \cdot R_{ec}) \end{bmatrix}$$

$$= \begin{bmatrix} \frac{RT_i}{V_i} \cdot \left(-\eta_{v0}\frac{V_d N_e}{120 RT_i}p_i\right) \\ c \cdot (-c_p \cdot W_c \cdot T_{c_{us}} \cdot R_c) \\ 0 \\ -p_{ec_{us}} \cdot c \cdot c_p \cdot W_c \cdot T_{c_{ds}} \cdot R_{ec} \end{bmatrix} + $$

$$\begin{bmatrix} \frac{\gamma R}{V_i}T_{ic} & 0 & \frac{RT_i}{V_i} \cdot \frac{p_x \xi_{egr_{HP}}}{\sqrt{RT_x}} & 0 \\ 0 & \begin{array}{c} c \cdot c_p \cdot \\ (W_c + W_f) \cdot T_x \end{array} & 0 & 0 \\ \frac{RT_i}{p_i V_i} \cdot & 0 & \frac{RT_i}{p_i V_i} \cdot \frac{p_x \xi_{egr_{HP}}}{\sqrt{RT_x}} \cdot & 0 \\ (F_c - F_i) & & (F_x - F_i) & \\ 0 & 0 & 0 & c \end{bmatrix} \cdot \begin{bmatrix} W_{itv} \\ R_t \\ CdA_{egr_{HP}} \\ P_e \end{bmatrix}.$$

defining an output vector y as:

$$y = \begin{bmatrix} p_i \\ \beta_x \\ F_i \\ \beta_{ec} \end{bmatrix}$$

an input vector u as:

$$u = \begin{bmatrix} W_{itv} \\ R_t \\ CdA_{egr\_HP} \\ P_e \end{bmatrix}$$

a first vector Cf(x) of functions as:

$$cf(x) = \begin{bmatrix} \frac{RT_i}{V_i} \cdot \left(-\eta_{v0}\frac{V_d N_e}{120 RT_i}p_i\right) \\ c \cdot (-c_p \cdot W_c \cdot T_{c_{us}} \cdot R_c) \\ 0 \\ -p_{ec\_us} \cdot c \cdot c_p \cdot W_c \cdot T_{c\_ds} \cdot R_{ec} \end{bmatrix}$$

and a matrix Gg(x) of functions as:

$$Gg(x) = \begin{bmatrix} \frac{\gamma R}{V_i}T_{ic} & 0 & \frac{RT_i}{V_i} \cdot \frac{p_x \xi_{egr\_HP}}{\sqrt{RT_x}} & 0 \\ 0 & c \cdot c_p \cdot (W_c + W_f) \cdot T_x & 0 & 0 \\ \frac{RT_i}{p_i V_i} \cdot & 0 & \frac{RT_i}{p_i V_i} \cdot \frac{p_x \xi_{egr\_HP}}{\sqrt{RT_x}} \cdot & 0 \\ (F_c - F_i) & & (F_x - F_i) & \\ 0 & 0 & 0 & c \end{bmatrix}$$

the matrix equation above may be rewritten as follows:

$$\dot{y} = Gg(x) \cdot u + Cf(x)$$

where x generically indicates a vector of state variables of the air charging system 195. As a consequence, it is possible to define a vector v of virtual inputs:

$$v = \begin{bmatrix} v_1 \\ v_2 \\ v_3 \\ v_4 \end{bmatrix}$$

and use this virtual input vector v to develop a feedback linearization control algorithm u(x,v) according to the following matrix equation:

$$u(x,v) = Gg(x)^{-1} \cdot (v - Cf(x))$$

such that:

$$\dot{y} = v$$

The MIMO non-linear mathematical system has been transformed in an equivalent linear system, where each one of the virtual inputs $v_1$, $v_2$, $v_3$ and $v_4$ is related to only one of the output parameters $\dot{p}_i$, $\dot{\beta}_c$, $\dot{F}_i$ and $\dot{\beta}_{ec}$ and vice versa, and where the relation between each one of the virtual inputs and the respective output parameter is a linear relation.

Taking advantage of this transformation, the ECU 450, by the processor 452, may be configured to control the intake valve actuator 332, the EGR valve actuator 322, the VGT actuator 290 and the electric motor 605 of the air compressor 600 during the operation of the ICE 110, by the linear control procedure illustrated in FIG. 7. This provides an implementation of the control strategy when the above identified actuators are involved when the air compressor 600 is disposed in the intake duct downstream of the compressor 240 of the variable-geometry turbocharger 230.

This control procedure provides for the ECU 450, by the processor 452, to monitor (module S400) and receive data on the value of the output parameters of the air charging system 195, namely the compression rate $\beta_c$, the intake manifold pressure $p_i$, the residual gas fraction $F_i$ in the intake manifold 200 and the compression rate $\beta_{ec}$, along with the value of the other observable state variables of the system and constants involved in the MIMO non-linear mathematical model above, namely the intake manifold inner volume $V_i$, the air temperature $T_i$ within the intake manifold 200, the exhaust gas pressure $p_x$ in the exhaust manifold, the HP-EGR correction coefficient $\xi_{egr\_HP}$, the exhaust gas temperature $T_x$ within the exhaust manifold 225, the volumetric efficiency $\eta_{v0}$ of the engine, the displacement $V_d$ of the engine, the engine speed $N_e$, the constant c, the specific heat capacity $c_p$ of a gas at constant pressure, the mass flow rate $W_c$ of the air/gas flow through the compressor 240 of the turbocharger 230, the mass flow rate $W_f$ of fuel injected into the combustion chambers 150 of the engine 110, the temperature $T_{c\_us}$ of the air/gas flow in the intake duct 205 upstream of the compressor 240, the compressor power rate $R_c$, the residual gas fraction $F_x$ within the exhaust manifold 225, the residual gas fraction $F_c$, the air temperature $T_{c\_ds}$ downstream of the compressor 240 and the power rate $R_{ec}$ of the air compressor 600.

In this regard, the value of the compression rate $\beta_c$ may be determined as the ratio between the pressure in the duct upstream the throttle 331 and compressor upstream pressure $p_{c\_us}$. The value of intake manifold pressure $p_i$ may be measured by the manifold pressure and temperature sensor 350 located in the intake manifold 200. The value of the intake manifold inner volume $V_i$ is a constant that depends on the geometry of the air charging system. The value of the residual gas fraction $F_i$ may be calculated as a function of the value of an oxygen concentration $O_2$ within the intake manifold 200, according to the equation $F_i=1-O_2$. The oxygen concentration value $O_2$ may be measured by a dedicated sensor disposed in the intake manifold 200 or may be estimated on the basis of other measurable operating parameters of the ICE 110. The value of the compression rate $\beta_{ec}$ may be calculated may be determined as the ratio between $p_{itv\_us}$ and $p_{c\_ds}$.

The value of the intake manifold air temperature $T_i$ may be measured (downstream of the intercooler 260) by the manifold pressure and temperature sensor 350 located in the intake manifold 200. The value of the exhaust manifold pressure $p_x$ may be measured by a pressure sensor that may be disposed in the exhaust manifold 225 or in the exhaust pipe 275 upstream of the turbine 250. As an alternative, this pressure value may be estimated on the basis of other measurable operating parameters of the ICE 110, for example on the basis of the measurements made by the exhaust pressure and temperature sensors 430. The value of the HP-EGR correction coefficient $\xi_{egr\_HP}$ is a nonlinear function of the pressure ratio across the HP-EGR valve. The value of the exhaust manifold gas temperature $T_x$ may be measured by a temperature sensor that may be disposed in the exhaust manifold 225 or in the exhaust pipe 275 upstream of the turbine 250. As an alternative, this temperature value may be estimated on the basis of other measurable operating parameters of the ICE 110, for example on the basis of the measurements made by the exhaust pressure and temperature sensors 430. The value of the volumetric efficiency $\eta_{vo}$ of the engine is a constant that depends on the geometry of the engine. The value of the displacement $V_d$ of the engine is a constant that depends on the geometry of the engine. The value of the engine speed $N_e$ may be measured by the crank position sensor 420. The value of $c$ is a constant. The value of the specific heat capacity $c_p$ is a constant. The value of the mass flow rate $W_c$ of the air/gas flow through the compressor 240 of the turbocharger 230 may be determined calculated starting from the measure air mass flow rate plus an estimation of the LP EGR flow. The value of the mass flow rate $W_f$ of fuel injected into the combustion chambers 150 of the engine 110 may be provided by the control strategies that operate the fuel injectors 160. The value of the temperature $T_{c\_us}$ of the air/gas flow in the intake duct 205 upstream of the compressor 240 may be determined on the basis of other measurable operating parameters in the intake duct 205 and in the LP pipe 500. The value of the compressor power rate $R_c$ may be determined as a function of the mass flow rate $W_c$ of the air/gas flow through the compressor 240, of the compression rate $\beta_c$, of the pressure $p_{c\_us}$, of the the temperature $T_{c\_us}$ and of the universal gas constant R. The value of the residual gas fraction $F_x$ at the exhaust manifold 225 may be measured by a lambda sensor located in the exhaust pipe 275, upstream of the aftertreatment devices 280. The value of the residual gas fraction $F_c$ may be determined as a function of the value of an oxygen concentration $O_{2c}$ at the intake duct 205 upstream the compressor 240, according to the equation $F_c=1-O_{2c}$. The compressor oxygen concentration $O_{2c}$ may be estimated on the basis of other measurable operating parameters in the intake duct 205. The value of the pressure $p_{c\_us}$ of the air/gas flow in the intake duct 205 upstream of the compressor 240 may be estimated on the basis of other measurable operating parameters in the intake duct 205. The air temperature $T_{c\_ds}$ downstream of the compressor 240 may be measured with a dedicated sensor or estimated. The power rate $R_{ec}$ can be calculated with the above-mentioned formula, wherein the air pressure $p_{c\_ds}$ downstream of the compressor 240 may be measured with a pressure sensor.

The monitored values of the output parameters $\beta_c$, $p_i$, $F_i$ and $\beta_{ec}$ are fed back and used to calculate an error (i.e. a difference) $e_1$, $e_2$, $e_3$ and $e_4$ between each one of them and a corresponding target value $p_{i\_tar}$, $F_{i\_tar}$, $\beta_{ec\_tar}$ and $\beta_{ec\_tar}$ thereof:

$$e_1 = p_{i\_tar} - p_i$$

$$e_2 = \beta_{c\_tar} - \beta_c$$

$$e_3 = F_{i\_tar} - F_i$$

$$e_4 = \beta_{ec\_tar} - \beta_{ec}$$

The target values $p_{i\_tar}$, $\beta_{ec\_tar}$, $\beta_{ec\_tar}$ and $F_{i\_tar}$ for the output parameters may be determined by the ECU 450 through the processor 452, on the basis of other conventional strategies, for example on the basis of the engine operating point.

The first error $e_1$ is then applied as input to a first single-input single-output (SISO) linear controller S405 that yields as output a corresponding value for the first virtual input $v_1$. The second error $e_2$ is applied as input to a second SISO linear controller S410 that yields as output a corresponding value for the second virtual input $v_2$. The third error $e_3$ is applied as input to a third SISO linear controller S415 that yields as output a corresponding value for the third virtual input $v_3$. The fourth error $e_4$ is applied as input to a fourth SISO linear controller S420 that yields as output a corresponding value for the fourth virtual input $v_4$.

The four linear controller S405, S410, S415 and S420 may be for example proportional-integral (PI) controllers or proportional-integral-derivative (PID) controllers, and are tuned over the equivalent linear system explained above, such as to minimize the respective errors $e_1$, $e_2$, $e_3$ and $e_4$.

The values of the virtual inputs $v_1$, $v_2$, $v_3$ and $v_4$ are then applied to a non-linear calculation module S425, where they are used to calculate corresponding values of the input parameters $W_{itv}$, $R_t$, $CdA_{egr\_HP}$, and $P_e$ of the air charging system 195. In particular, the calculation module S420 may calculate the values of these input parameters with the feedback linearization control algorithm that have been previously explained:

$$u = \begin{bmatrix} W_{itv} \\ R_t \\ CdA_{egr\_HP} \\ P_e \end{bmatrix} = Gg(x)^{-1} \cdot (v - Cf(x))$$

The calculated value of the air mass flow rate $W_{itv}$ is then applied to a calculation module S430, which may use a mathematical model of the intake valve 330 to yield as output a position $U_{itv}$ of the actuator 332, which corresponds to the calculated value of the air mass flow rate $W_{itv}$. The calculated value of the power rate $R_t$ is applied to another calculation module S435, which may use a mathematical model of the turbine 250 to yield as output a position $U_{vgt}$ of the actuator 290, which corresponds to the calculated value of the power rate. The calculated value of the flow effective area $CdA_{egr\_HP}$ of the HP-EGR valve 320 is applied to still another calculation module S440, which may use a mathematical model of the HP-EGR valve 320 to yield as output a position $U_{egr}$ of the actuator 322, which corresponds to the calculated value of the flow effective area.

The air intake valve actuator 332, the EGR valve actuator 322 and the VGT actuator 290 are operated according to the respective calculated position $U_{itv}$, $U_{egr}$ and $U_{vgt}$ while the electric motor 605 of the air compressor 600 is operated according to the calculated value $P_e$ of the electrical power (actuator operating module S445).

Should the EGR system comprise both the HP-EGR conduits 300 and the LP-EGR 500, as shown in FIGS. 4 and 5, the actuators of the air charging system 195 comprise the intake valve actuator 332, the HP-EGR valve actuator 322, the VGT actuator 290, the electric motor 605 of the air compressor 600 and also the LP-EGR valve actuator 522.

Figure 8:
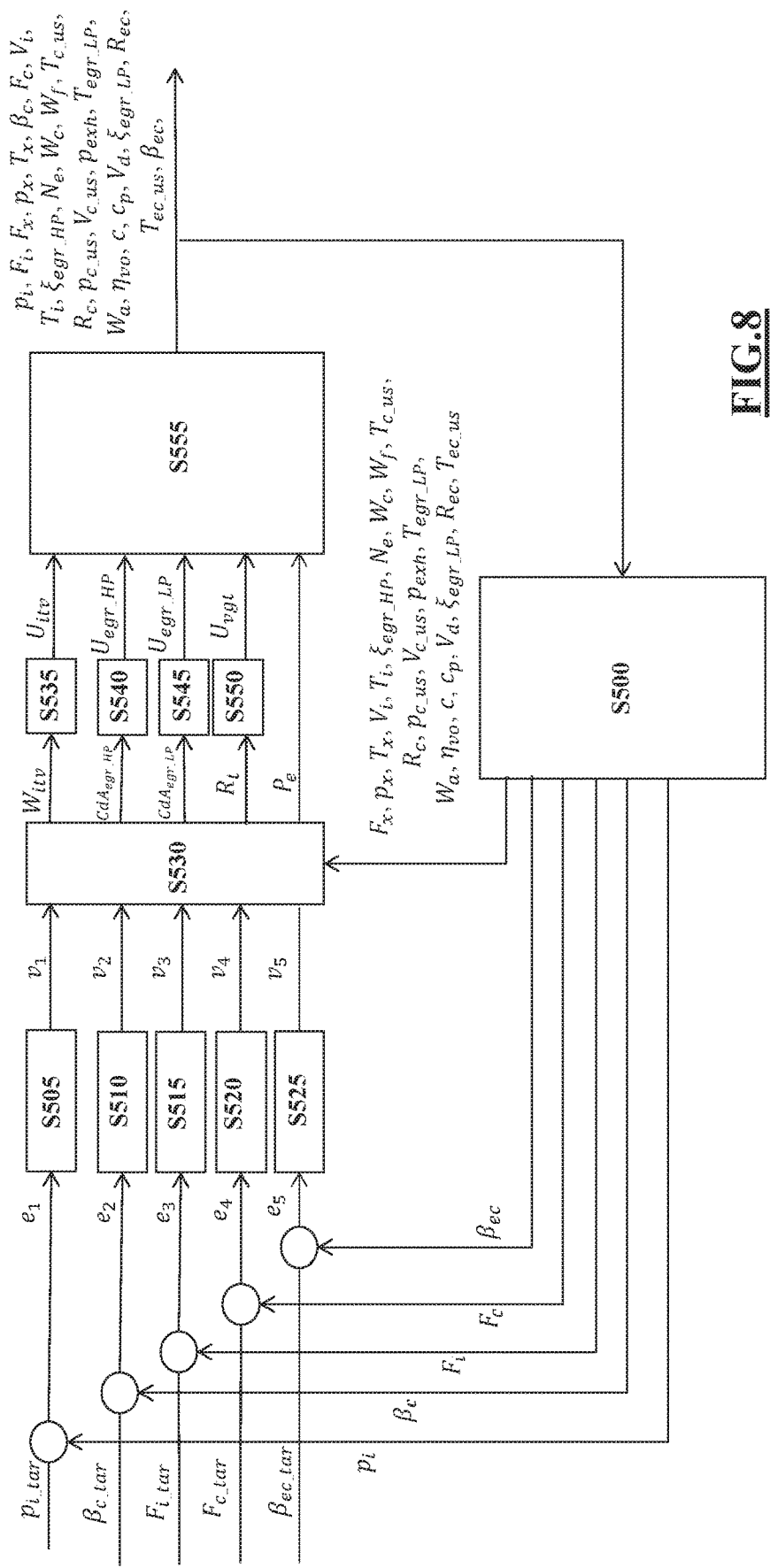
FIG. 8 schematically shows an example of an air charging multivariable nonlinear control system of the automotive system of FIG. 4 using feedback linearization control.

With reference to FIG. 8, for the embodiment of FIG. 4 where the air compressor 600 is located upstream of the compressor 240 of the turbocharger 230, the input parameters of the air charging system 195 may include a parameter $W_{itv}$ indicative of the air mass flow rate through the intake valve 330, a parameter $CdA_{egr\_HP}$ indicative of a flow effective area of the HP-EGR valve 320, a parameter $R_t$ indicative of a turbine power rate, a parameter $CdA_{egr\_LP}$ indicative of a flow effective area of the LP-EGR valve 520, and a parameter $P_e$ indicative of an electrical power supplied to the electric motor 605.

The output parameters of the air charging system 195 may include a parameter $p_i$ indicative of an intake manifold pressure, a parameter $F_i$ indicative of a residual gas fraction in the intake manifold 200, a parameter $\beta_c$ indicative of a compression rate caused by the compressor 240 of the turbocharger 230, a parameter $F_c$ indicative of a residual gas fraction in the intake duct 205 upstream of the compressor 240 of the turbocharger 230, such as between the leading point of the LP-EGR conduit 500 and the compressor 240, and a parameter $\beta_{ec}$ indicative of the compression rate caused by the air compressor 600 (namely the ratio between the air pressure upstream and downstream of the air compressor 600).

The MIMO non-linear mathematical model of the air charging system 195 may be defined by the following equations:

$$\dot{p}_i = \frac{dp_i}{dt} = \frac{RT_i}{V_i}\left(W_{itv} + \frac{p_x \xi_{egr\_HP}}{\sqrt{RT_x}} CdA_{egr\_HP} - \eta_{v0}\frac{V_d N_e}{120 RT_i}p_i\right)$$

$$\dot{\beta}_c = \frac{d\beta_c}{dt} = c \cdot (c_p \cdot (W_c + W_f) \cdot T_x \cdot R_t - c_p \cdot W_c \cdot T_{c\_us} \cdot R_c)$$

$$\dot{F}_i = \frac{dF_i}{dt} = \frac{RT_i}{p_i V_i}\left(\frac{p_x \xi_{egr\_HP}}{\sqrt{RT_x}} CdA_{egr\_HP}(F_x - F_i) + W_{itv}(F_c - F_i)\right)$$

$$\dot{F}_c = \frac{dF_c}{dt} = \frac{RT_{c\_us}}{p_{c\_us}V_{c\_us}}\left(\frac{p_{exh}\xi_{egr\_LP}}{\sqrt{RT_{egr\_LP}}} CdA_{egr\_LP}(F_x - F_c) - W_a F_c\right)$$

$$\dot{\beta}_{ec} = \frac{d\beta_{ec}}{dt} = c \cdot (P_e - c_p \cdot W_c \cdot T_{ec\_us} \cdot R_{ec})$$

wherein R is the universal gas constant, $V_i$ is an intake manifold inner volume, $T_i$ is an air temperature within the intake manifold 200, $p_x$ is an exhaust gas pressure within the exhaust manifold 225, $\xi_{egr\_HP}$ is an HP-EGR correction factor, $T_x$ is an exhaust gas temperature within the exhaust manifold 225, $\eta_{v0}$ is a volumetric efficiency of the engine, $V_d$ is a displacement of the engine, $N_e$ is an engine rotational speed, c is a constant related to the turbocharger inertia, $c_p$ is a specific heat capacity of a gas at constant pressure, $W_c$ is a mass flow rate of the air/gas flow through the compressor 240 of the turbocharger 230, $W_f$ is a mass flow rate of fuel injected into the combustion chambers 150 of the engine 110, $T_{c\_us}$ is a temperature of the air/gas flow in the intake duct 205 upstream of the compressor 240, $R_c$ is a compressor power rate, $F_x$ is a residual gas fraction within the exhaust manifold 225, $p_{c\_us}$ is a pressure of the air/gas flow in the intake duct 205 upstream of the compressor 240, $V_{c\_us}$ is a volume of the intake duct 205 upstream of the compressor 240, $\xi_{egr\_LP}$ is a LP-EGR correction factor, $p_{exh}$ is a pressure of the exhaust gas in the exhaust pipe 275 downstream of the aftertreatment devices 280, $T_{egr\_LP}$ is a temperature of the exhaust gas in the LP-EGR conduit 500 and $W_a$ is an air mass flow rate in the intake duct 205, $T_{ec\_us}$ is the air temperature upstream of the air compressor 600, such as between the compressor 600 and the mass air flow and temperature sensor 340, and $R_{ec}$ is a power rate of the air compressor 600. It should be observed that $R_{ec}$ may be a function of the following parameters:

$$R_{ec} = f\left(\frac{W_c\sqrt{(T_{ec\_us}/)T_{ref}}}{p_{ec\_us}}, \beta_{ec}\right)$$

wherein $T_{ref}$ is the reference temperature used to correct the compressor maps, $p_{ec\_us}$ is the air pressure upstream of the air compressor 600, such as between the air compressor 600 and the mass air flow and temperature sensor 340, and $\beta_{ec}$ is the compression rate caused by the air compressor 600, namely the ratio between the air pressure upstream and downstream of the air compressor 600.

Similarly, $R_c$ may be a function of the following parameters:

$$R_c = f\left(\frac{W_c\sqrt{(T_{c\_us}/)R}}{p_{c\_us}}, \beta_c\right)$$

wherein $p_{c\_us}$ is the air pressure upstream of the compressor 240 of the turbocharger 230, such as between the compressor 240 and the mass air flow and temperature sensor 340.

The MIMO non-linear mathematical model of the air charging system 195 may be equally defined by the following matrix equation:

$$\begin{bmatrix}\dot{p}_i \\ \dot{\beta}_c \\ \dot{F}_i \\ \dot{F}_c \\ \dot{\beta}_{ec}\end{bmatrix} = \begin{bmatrix}\frac{RT_i}{V_i}\left(W_{itv} + \frac{p_x \xi_{egr\_HP}}{\sqrt{RT_x}} CdA_{egr\_HP} - \eta_{v0}\frac{V_d N_e}{120 RT_i}p_i\right) \\ c \cdot (c_p \cdot (W_c + W_f) \cdot T_x \cdot R_t - c_p \cdot W_c \cdot T_{c\_us} \cdot R_c) \\ \frac{RT_i}{p_i V_i}\left(\frac{p_x \xi_{egr\_HP}}{\sqrt{RT_x}} CdA_{egr\_HP}(F_x - F_i) + W_{itv}(F_c - F_i)\right) \\ \frac{RT_{c\_us}}{p_{c\_us}V_{c\_us}}\left(\frac{p_{exh}\xi_{egr\_LP}}{\sqrt{RT_{egr\_LP}}} CdA_{egr_{LP}}(F_x - F_c) - W_a F_c\right) \\ c \cdot (P_e - c_p \cdot W_c \cdot T_{ec\_us} \cdot R_{ec})\end{bmatrix}$$

$$= \begin{bmatrix}\frac{RT_i}{V_i} \cdot \left(-\eta_{v0}\frac{V_d N_e}{120 RT_i}p_i\right) \\ c \cdot (-c_p \cdot W_c \cdot T_{cus} \cdot R_c) \\ \frac{RT_{c\_us}}{p_{c\_us}V_{c\_us}} \cdot (-W_a F_c) \\ -p_{ec\_us} \cdot c \cdot c_p \cdot W_c \cdot T_{ec\_us} \cdot R_{ec}\end{bmatrix} +$$

-continued $$\begin{bmatrix} \frac{RT_i}{V_i} & \frac{RT_i}{V_i} \cdot \frac{p_x \xi_{egr\_HP}}{\sqrt{RT_x}} & 0 & 0 & 0 \\ 0 & 0 & 0 & c \cdot c_p \cdot (W_c + W_f) \cdot T_x & 0 \\ \frac{RT_i}{p_i V_i} \cdot (F_c - F_i) & \frac{RT_i}{p_i V_i} \cdot \frac{p_x \xi_{egr\_HP}}{\sqrt{RT_x}} \cdot (F_x - F_i) & 0 & 0 & 0 \\ 0 & 0 & \frac{RT_{c\_us}}{p_{c\_us} V_{c\_us}} \cdot \frac{p_{exh} \xi_{egr\_LP}}{\sqrt{RT_{egr\_LP}}} \cdot (F_x - F_c) & 0 & 0 \\ 0 & 0 & 0 & 0 & c \end{bmatrix}$$

$$\begin{bmatrix} W_{itv} \\ CdA_{egr\_HP} \\ CdA_{egr\_LP} \\ R_t \\ P_e \end{bmatrix}$$

defining an output vector y as:

$$y = \begin{bmatrix} p_i \\ \beta_c \\ F_i \\ F_c \\ \beta_{ec} \end{bmatrix}$$

an input vector u as:

$$u = \begin{bmatrix} W_{itv} \\ CdA_{egr\_HP} \\ CdA_{egr\_LP} \\ R_t \\ P_e \end{bmatrix}$$

a first vector f(x) of functions as:

$$f(x) = \begin{bmatrix} \frac{RT_i}{V_i} \cdot \left(-\eta_{v0} \frac{V_d N_e}{120 RT_i} p_i\right) \\ c \cdot (-c_p \cdot W_c \cdot T_{cus} \cdot R_c) \\ 0 \\ \frac{RT_{c\_us}}{p_{c\_us} V_{c\_us}} \cdot (-W_G F_c) \\ -p_{ec\_us} \cdot c \cdot c_p \cdot W_c \cdot T_{ec\_us} \cdot R_{ec} \end{bmatrix}$$

and a matrix Gg(x) of functions as:

$$Gg(x) = \begin{bmatrix} \frac{RT_i}{V_i} & \frac{RT_i}{V_i} \cdot \frac{p_x \xi_{egr\_HP}}{\sqrt{RT_x}} & 0 & 0 & 0 \\ 0 & 0 & 0 & c \cdot c_p \cdot (W_c + W_f) \cdot T_x & 0 \\ \frac{RT_i}{p_i V_i} \cdot (F_c - F_i) & \frac{RT_i \cdot p_x \xi_{egr\_HP}}{p_i V_i \cdot \sqrt{RT_x}} \cdot (F_x - F_i) & 0 & 0 & 0 \\ 0 & 0 & \frac{RT_{c\_us}}{p_{c\_us} V_{c\_us}} \cdot \frac{p_{exh} \xi_{egr\_LP}}{\sqrt{RT_{egr\_LP}}} \cdot (F_x - F_c) & 0 & 0 \\ 0 & 0 & 0 & 0 & c \end{bmatrix}$$

the matrix equation above may be written, also in this case, in the general form:

$$\dot{y} = f(x) + Gg(x) \cdot u$$

where x generically indicates a vector of state variables of the air charging system 195.

As a consequence, it is possible to define a vector v of virtual inputs:

$$v = \begin{bmatrix} v_1 \\ v_2 \\ v_3 \\ v_4 \\ v_5 \end{bmatrix}$$

and use this virtual input vector v to develop a feedback linearization control algorithm u(x,v) according to the following matrix equation:

$$u(x,v) = Gg(x)^{-1} \cdot (v - f(x))$$

such that:

$$\dot{y} = v$$

Hence, also in this case the MIMO non-linear mathematical system has been transformed in an equivalent linear system, where each one of the virtual inputs $v_1$, $v_2$, $v_3$, $v_4$ and $v_5$ is related to only one of the output parameters $\dot{p}_i$, $\dot{\beta}_c$, $\dot{F}_i$, $\dot{F}_c$ and $\dot{\beta}_{ec}$ and vice versa, and where the relation between each one of the virtual inputs and the respective output parameter is a linear relation.

Taking advantage of this transformation, the ECU 450, by the processor 452, may be configured to control the intake valve actuator 332, the HP-EGR valve actuator 322, the VGT actuator 290 and the LP-EGR valve actuator 522 during the operation of the ICE 110, by the linear control procedure as illustrated in FIG. 8. This provides a coordinated control of the actuators of the air charging system when the air charging system comprises two EGR pipes and thus two EGR valves individually disposed in those pipes.

This control procedure provides for the ECU 450, by the processor 452, to monitor (module S500), and receive data on, the value of the output parameters of the air charging system 195, namely the compression rate $\beta_c$, the intake manifold pressure $p_i$, the residual gas fraction $F_i$ in the intake manifold 200 and the residual gas fraction $F_c$, and the compression rate $\beta_{ec}$ along with the value of the other observable state variables of the system and constants involved in the MIMO non-linear mathematical model above, namely the intake manifold inner volume $V_i$, the air temperature $T_i$ within the intake manifold 200, the exhaust gas pressure $p_x$ in the exhaust manifold, the HP-EGR correction coefficient $\xi_{egr\_HP}$, the exhaust gas temperature $T_x$ within the exhaust manifold 225, the volumetric efficiency $\eta_{v0}$ of the engine, the displacement $V_d$ of the engine, the engine speed $N_e$, the constant c, the specific heat capacity $c_p$ of a gas at constant pressure, the mass flow rate $W_c$ of the air/gas flow through the compressor 240 of the turbocharger 230, the mass flow rate $W_f$ of fuel injected into the combustion chambers 150 of the engine 110, the temperature $T_{c\_us}$ of the air/gas flow in the intake duct 205 upstream of the compressor 240, the compressor power rate $R_c$, the residual gas fraction $F_x$ within the exhaust manifold 225, the pressure $p_{c\_us}$ of the air/gas flow in the intake duct 205 upstream of the compressor 240, the volume $V_{c\_us}$ of the intake duct 205 upstream of the compressor 240, the LP-EGR correction coefficient $\xi_{egr\_LP}$, the pressure $p_{exh}$ of the exhaust gas in the exhaust pipe 275 downstream of the aftertreatment devices 280, the temperature $T_{egr\_LP}$ of the exhaust gas in the LP-EGR conduit 500, the air mass flow rate $W_a$ in the intake duct 205, the air temperature $T_{ec\_us}$ upstream of the air compressor 600, such as between the compressor 600 and the mass air flow and temperature sensor 340 and the power rate $R_{ec}$ of the air compressor 260.

In this regard, the value of the compression rate $\beta_c$ may be determined as the ratio between the pressure in the duct upstream the throttle 331 and compressor upstream pressure $p_{c_{us}}$. The value of intake manifold pressure $p_i$ may be measured by the manifold pressure and temperature sensor 350 located in the intake manifold 200. The value of the intake manifold inner volume $V_i$ is a constant that depends on the geometry of the air charging system. The value of the residual gas fraction $F_i$ may be calculated as a function of the value of an oxygen concentration $O_2$ within the intake manifold 200, according to the equation $F_i=1-O_2$. The oxygen concentration value $O_2$ may be measured by a dedicated sensor disposed in the intake manifold 200 or may be estimated on the basis of other measurable operating parameters of the ICE 110. The value of the residual gas fraction $F_c$ may be determined as a function of the value of an oxygen concentration $O_{2c}$ at the intake duct 205 upstream the compressor 240, according to the equation $F_c=1-O_{2c}$. The compressor oxygen concentration $O_{2c}$ may be estimated on the basis of other measurable operating parameters in the intake duct 205 and in the LP pipe 500. The value of the intake manifold air temperature $T_i$ may be measured (downstream of the intercooler 260) by the manifold pressure and temperature sensor 350 located in the intake manifold 200. The value of the exhaust manifold pressure $p_x$ may be measured by a pressure sensor that may be disposed in the exhaust manifold 225 or in the exhaust pipe 275 upstream of the turbine 250. As an alternative, this pressure value may be estimated on the basis of other measurable operating parameters of the ICE 110, for example on the basis of the measurements made by the exhaust pressure and temperature sensors 430. The value of the HP-EGR correction coefficient $\xi_{egr_{HP}}$ is a nonlinear function of the pressure ratio across the HP-EGR valve. The value of the exhaust manifold gas temperature $T_x$ may be measured by a temperature sensor that may be disposed in the exhaust manifold 225 or in the exhaust pipe 275 upstream of the turbine 250. As an alternative, this temperature value may be estimated on the basis of other measurable operating parameters of the ICE 110, for example on the basis of the measurements made by the exhaust pressure and temperature sensors 430. The value of the volumetric efficiency $\eta_{v0}$ of the engine is a constant that depends on the geometry of the engine. The value of the displacement $V_d$ of the engine is a constant that depends on the geometry of the engine. The value of the engine speed $N_e$ may be measured by the crank position sensor 420. The value of c is a constant. The value of the specific heat capacity $c_p$ is a constant. The value of the mass flow rate $W_c$ of the air/gas flow through the compressor 240 of the turbocharger 230 may be determined as the sum of the air mass flow rate $W_a$ and the mass flow rate through the LP EGR. The value of the mass flow rate $W_f$ of fuel injected into the combustion chambers 150 of the engine 110 may be provided by the control strategies that operate the fuel injectors 160. The value of the temperature $T_{c_{us}}$ of the air/gas flow in the intake duct 205 upstream of the compressor 240 may be determined on the basis of other measurable operating parameters in the intake duct 205 and in the LP pipe 500. The value of the compressor power rate $R_c$ may be determined as a function of the mass flow rate $W_c$ of the air/gas flow through the compressor 240, of the compression rate $\beta_c$, of the pressure $p_{c_{us}}$, of the temperature $T_{c_{us}}$ and of the universal gas constant R. The value of the residual gas fraction $F_x$ at the exhaust manifold 225 may be measured by a lambda sensor located in the exhaust pipe 275, upstream of the aftertreatment devices 280. The value of the pressure $p_{c_{us}}$ of the air/gas flow in the intake duct 205 upstream of the compressor 240 may be estimated on the basis of other measurable operating parameters in the intake duct 205 and on the LP pipe 500. The value of the volume $V_{c_{us}}$ of intake duct upstream of the compressor 240 is a constant that depends on the geometry of the air charging system. The value of the LP-EGR correction coefficient $\xi_{egr_{LP}}$ is a non-linear function of the pressure ratio across the LP-EGR valve. The pressure $p_{exh}$ of the exhaust gas in the exhaust pipe 275 downstream of the aftertreatment devices 280 may be determined on the basis of other measurable operating parameters in the exhaust pipe 275. The value of the temperature $T_{egr_{LP}}$ of the exhaust gas in the LP-EGR conduit 500 may be measured by a dedicated sensor located in the duct upstream the LP EGR valve 521. The value of the air mass flow rate $W_a$ in the intake duct 205 may be calculated by the sensor 340. The air temperature $T_{ec_{us}}$ may be measured with a dedicated sensor or estimated. The power rate $R_{ec}$ can be calculated with the above-mentioned formula, wherein the air pressure $p_{ec_{ds}}$ may be measured with a pressure sensor and $\beta_{ec}$ may be determined as the ratio between $p_{itv_{us}}$ and $p_{c_{ds}}$.

The monitored values of the output parameters $\beta_c$, $p_i$, $F_i$, $F_c$ and $\beta_{ec}$ are fed back and used by the processor 452 to calculate an error (i.e. a difference) $e_1$, $e_2$, $e_3$, $e_4$ and $e_5$ between each one of them and a corresponding target value $p_{i\_tar}$, $F_{i\_tar}$, $\beta_{c\_tar}$, $F_{c\_tar}$ and $\beta_{ec\_tar}$ thereof:

$$e_1 = p_{i\_tar} - p_i$$

$$e_2 = \beta_{c\_tar} - \beta_c$$

$$e_3 = F_{i\_tar} - F_i$$

$$e_4 = F_{c\_tar} - F_c$$

$$e_5 = \beta_{ec\_tar} - \beta_{ec}$$

The target values $p_{i\_tar}$, $\beta_{c\_tar}$, $F_{i\_tar}$, $\beta_{ec\_tar}$ and $F_{c\_tar}$ for the output parameters may be determined via the ECU 450, by the processor 452, on the basis of other conventional strategies, for example on the basis of the engine operating point.

The first error $e_1$ is then applied as input to a first single-input single-output (SISO) linear controller S505 that yields as output a corresponding value for the first virtual input $v_1$. The second error $e_2$ is applied as input to a second SISO linear controller S510 that yields as output a corresponding value for the second virtual input $v_2$. The third error $e_3$ is applied as input to a third SISO linear controller S515 that yields as output a corresponding value for the third virtual input $v_3$. The fourth error $e_4$ is applied as input to a fourth SISO linear controller S520 that yields as output a corresponding value for the fourth virtual input $v_4$. The fifth error $e_5$ is applied as input to a fourth SISO linear controller S525 that yields as output a corresponding value for the fifth virtual input $v_5$.

The five linear controllers S505, S510, S515, S520 and S525 may be for example proportional-integral (PI) controllers or proportional-integral-derivative (PID) controllers for calculating the outputs, and are tuned over the equivalent linear system explained above, such as to minimize the respective errors $e_1$, $e_2$, $e_3$, $e_4$ and $e_5$.

The values of the virtual inputs $v_1$, $v_2$, $v_3$, $v_4$ and $v_5$ are then applied to a non-linear calculation module S530, where they are used to calculate corresponding values of the input parameters $W_{itv}$, $CdA_{egr\_HP}$, $CdA_{egr\_LP}$, $R_t$ and $P_e$ of the air charging system 195. In particular, the calculation module S530 may calculate these input parameters with the feedback linearization control algorithm that have been previously explained:

$$u = \begin{bmatrix} W_{itv} \\ CdA_{egr\_HP} \\ CdA_{egr\_LP} \\ R_t \\ P_e \end{bmatrix} = Gg(x)^{-1} \cdot (v - f(x))$$

The calculated value of the air mass flow rate $W_{itv}$ is then applied to a calculation module S535, which may use a mathematical model of the intake valve 330 to yield as output a position $U_{itv}$ of the actuator 332, which corresponds to the calculated value of the air mass flow rate $W_{itv}$. The calculated value of the flow effective area $CdA_{egr\_HP}$ is applied to another calculation module S540, which may use a mathematical model of the HP-EGR valve 320 to yield as output a position $U_{egr\_HP}$ of the actuator 322, which corresponds to the calculated value of the flow effective area $CdA_{egr\_HP}$. The calculated value of the flow effective area $CdA_{egr\_LP}$ is applied to still another calculation module S545, which may use a mathematical model of the LP-EGR valve 520 to yield as output a position $U_{egr\_LP}$ of the actuator 522, which corresponds to the calculated value of the flow effective area $CdA_{egr\_LP}$. The calculated value of the turbine power rate $R_t$ is applied to still another calculation module S550 of the turbine 250 to yield as output a position $U_{vgt}$ of the actuator 290, which corresponds to the calculated value of the turbine power rate $R_t$.

The air intake valve actuator 332, the HP-EGR valve actuator 322, the LP-EGR valve actuator 522 and the VGT actuator 290 are operated according to the values of respective calculated position $U_{itv}$, $U_{egr\_HP}$, $U_{egr\_LP}$ and $U_{vgt}$ while the electric motor 605 of the air compressor 600 is operated according to the calculated value $P_e$ of the electrical power (actuator operating module S555).

Figure 9:
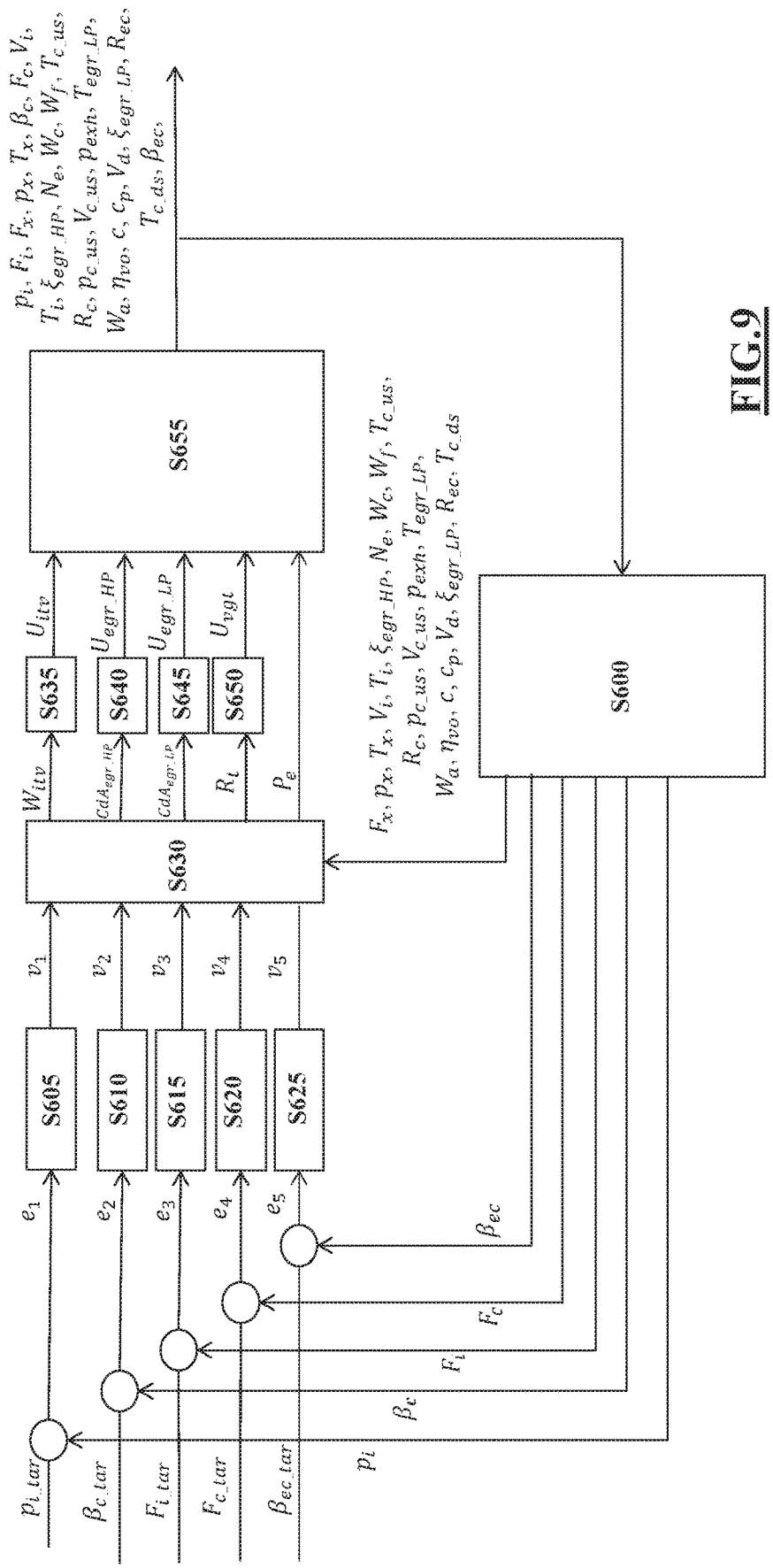
FIG. 9 schematically shows an example of an air charging multivariable nonlinear control system of the automotive system of FIG. 5 using feedback linearization control.

Referring to FIG. 9, for the embodiment of FIG. 5 where the air compressor 600 is located downstream of the compressor 240 of the turbocharger 230, the input parameters and the output parameters of the air charging system 195 may be the same disclosed above with reference to the embodiment of FIG. 4. However, the MIMO non-linear mathematical model of the air charging system 195 may be slightly modified and defined by the following equations:

$$\dot{p}_i = \frac{dp_i}{dt} = \frac{RT_i}{V_i}\left( W_{itv} + \frac{p_x \xi_{egr\_HP}}{\sqrt{RT_x}} CdA_{egr\_HP} - \eta_{v0} \frac{V_d N_e}{120 RT_i} p_i \right)$$

$$\dot{\beta}_c = \frac{d\beta_c}{dt} = c \cdot (c_p \cdot (W_c + W_f) \cdot T_x \cdot R_t - c_p \cdot W_c \cdot T_{c\_us} \cdot R_c)$$

$$\dot{F}_i = \frac{dF_i}{dt} = \frac{RT_i}{p_i V_i}\left( \frac{p_x \xi_{egr\_HP}}{\sqrt{RT_x}} CdA_{egr\_HP}(F_x - F_i) + W_{itv}(F_c - F_i) \right)$$

$$\dot{F}_c = \frac{dF_c}{dt} = \frac{RT_{c\_us}}{p_{c\_us} V_{c\_us}}\left( \frac{p_{exh} \xi_{egr\_LP}}{\sqrt{RT_{egr\_LP}}} CdA_{egr\_LP}(F_x - F_c) - W_a F_c \right)$$

$$\dot{\beta}_{ec} = \frac{d\beta_{ec}}{dt} = c \cdot (P_e - c_p \cdot W_c \cdot T_{c\_ds} \cdot R_{ec})$$

wherein R is the universal gas constant, $V_i$ is an intake manifold inner volume, $T_i$ is an air temperature within the intake manifold 200, $p_x$ is an exhaust gas pressure within the exhaust manifold 225, $\xi_{egr\_HP}$ is an HP-EGR correction factor, $T_x$ is an exhaust gas temperature within the exhaust manifold 225, $\eta_{v0}$ is a volumetric efficiency of the engine, $V_d$ is a displacement of the engine, $N_e$ is an engine rotational speed, c is a constant related to the turbocharger inertia, $c_p$ is a specific heat capacity of a gas at constant pressure, $W_c$ is a mass flow rate of the air/gas flow through the compressor 240 of the turbocharger 230, $W_f$ is a mass flow rate of fuel injected into the combustion chambers 150 of the engine 110, $T_{c\_us}$ is a temperature of the air/gas flow in the intake duct 205 upstream of the compressor 240, $R_c$ is a compressor power rate, $F_x$ is a residual gas fraction within the exhaust manifold 225, $p_{c\_us}$ is a pressure of the air/gas flow in the intake duct 205 upstream of the compressor 240, $V_{c\_us}$ is a volume of the intake duct 205 upstream of the compressor 240, $\xi_{egr\_LP}$ is a LP-EGR correction factor, $p_{exh}$ is a pressure of the exhaust gas in the exhaust pipe 275 downstream of the aftertreatment devices 280, $T_{egr\_LP}$ is a temperature of the exhaust gas in the LP-EGR conduit 500 and $W_a$ is an air mass flow rate in the intake duct 205, $T_{c\_ds}$ is the air temperature downstream of the air compressor 600, such as between the air compressor 600 an the intercooler 260 and $R_{ec}$ is a power rate of the air compressor 600.

It should be observed that $R_{ec}$ may be in this case a function of the following parameters:

$$R_{ec} = f\left( \frac{W_c \sqrt{(T_{c\_ds}/)T_{ref}}}{p_{c\_ds}}, \beta_{ec} \right)$$

wherein $T_{ref}$ is the reference temperature used to correct the compressor maps, $p_{c\_ds}$ is the air pressure downstream of the air compressor 600, such as between the air compressor 600 and intercooler 260, and $\beta_{ec}$ is the compression rate caused by the air compressor 600, namely the ratio between the air pressure upstream and downstream of the air compressor 600.

In addition, $R_c$ may be a function of the following parameters:

$$R_c = f\left(\frac{W_c\sqrt{(T_{c\_us}/)R}}{p_{c\_us}}, \beta_c\right)$$

wherein $p_{c\_us}$ is the air pressure upstream of the compressor 240 of the turbocharger 230, such as between the compressor 240 and the mass air flow and temperature sensor 340.

The MIMO non-linear mathematical model of the air charging system 195 may be equally defined by the following matrix equation:

$$\begin{bmatrix} \dot{p}_i \\ \dot{\beta}_c \\ \dot{F}_i \\ \dot{F}_c \\ \dot{\beta}_{ec} \end{bmatrix} = \begin{bmatrix} \frac{RT_i}{V_i}\left(W_{itv} + \frac{p_x\xi_{egr\_HP}}{\sqrt{RT_x}}CdA_{egr\_HP} - \eta_{v0}\frac{V_dN_e}{120RT_i}p_i\right) \\ c \cdot (c_p \cdot (W_c + W_f) \cdot T_x \cdot R_t - c_p \cdot W_c \cdot T_{c-us} \cdot R_c) \\ \frac{RT_i}{p_iV_i}\left(\frac{p_x\xi_{egr\_HP}}{\sqrt{RT_x}}CdA_{egr\_HP}(F_x - F_i) + W_{itv}(F_c - F_i)\right) \\ \frac{RT_{c\_us}}{p_{c\_us}V_{c\_us}}\left(\frac{p_{exh}\xi_{egr\_LP}}{\sqrt{RT_{egr\_LP}}}CdA_{egr_{LP}}(F_x - F_c) - W_aF_c\right) \\ c \cdot (P_e - c_p \cdot W_c \cdot T_{c\_ds} \cdot R_{ec}) \end{bmatrix}$$

$$= \begin{bmatrix} \frac{RT_i}{V_i} \cdot \left(-\eta_{v0}\frac{V_dN_e}{120RT_i}p_i\right) \\ c \cdot (-c_p \cdot W_c \cdot T_{c_{us}} \cdot R_c) \\ 0 \\ \frac{RT_{c\_us}}{p_{c\_us}V_{c\_us}} \cdot (-W_aF_c) \\ -p_{ec\_us} \cdot c \cdot c_p \cdot W_c \cdot T_{ec\_us} \cdot R_{ec} \end{bmatrix} +$$

$$\begin{bmatrix} \frac{RT_i}{V_i} & \frac{RT_i}{V_i} \cdot \frac{p_x\xi_{egr\_HP}}{\sqrt{RT_x}} & 0 & 0 & 0 \\ 0 & 0 & 0 & \frac{c \cdot c_p \cdot (W_c + W_f) \cdot T_x}{} & 0 \\ \frac{RT_i}{p_iV_i} \cdot (F_c - F_i) & \frac{RT_i}{p_iV_i} \cdot \frac{p_x\xi_{egr\_HP}}{\sqrt{RT_x}} \cdot (F_x - F_i) & 0 & 0 & 0 \\ 0 & 0 & \frac{RT_{c\_us}}{p_{c\_us}V_{c\_us}} \cdot \frac{p_{exh}\xi_{egr\_LP}}{\sqrt{RT_{egr\_LP}}} \cdot (F_x - F_c) & 0 & 0 \\ 0 & 0 & 0 & 0 & c \end{bmatrix} \cdot \begin{bmatrix} W_{itv} \\ CdA_{egr\_HP} \\ CdA_{egr\_LP} \\ R_t \\ P_e \end{bmatrix}$$

defining an output vector y as:

$$y = \begin{bmatrix} p_i \\ \beta_c \\ F_i \\ F_c \\ \beta_{ec} \end{bmatrix}$$

an input vector u as:

$$u = \begin{bmatrix} W_{itv} \\ CdA_{egr\_HP} \\ CdA_{egr\_LP} \\ R_t \\ P_e \end{bmatrix}$$

a first vector f(x) of functions as:

$$f(x) = \begin{bmatrix} \frac{RT_i}{V_i} \cdot \left(-\eta_{v0}\frac{V_dN_e}{120RT_i}p_i\right) \\ c \cdot (-c_p \cdot W_c \cdot T_{c_{us}} \cdot R_c) \\ 0 \\ \frac{RT_{c\_us}}{p_{c\_us}V_{c\_us}} \cdot (-W_aF_c) \\ -p_{ec\_us} \cdot c \cdot c_p \cdot W_c \cdot T_{c\_ds} \cdot R_{ec} \end{bmatrix}$$

and a matrix Gg(x) of functions as:

$$Gg(x) = \begin{bmatrix} \frac{RT_i}{V_i} & \frac{RT_i}{V_i} \cdot \frac{p_x\xi_{egr\_HP}}{\sqrt{RT_x}} & 0 & 0 & 0 \\ 0 & 0 & 0 & \frac{c \cdot c_p \cdot (W_c + W_f) \cdot T_x}{} & 0 \\ \frac{RT_i}{p_iV_i} \cdot (F_c - F_i) & \frac{RT_i}{p_iV_i} \cdot \frac{p_x\xi_{egr\_HP}}{\sqrt{RT_x}} \cdot (F_x - F_i) & 0 & 0 & 0 \\ 0 & 0 & \frac{RT_{c\_us}}{p_{c\_us}V_{c\_us}} \cdot \frac{p_{exh}\xi_{egr\_LP}}{\sqrt{RT_{egr\_LP}}} \cdot (F_x - F_c) & 0 & 0 \\ 0 & 0 & 0 & 0 & c \end{bmatrix}$$

the matrix equation above may be written, also in this case, in the general form:

$$\dot{y} = f(x) + Gg(x) \cdot u$$

where x generically indicates a vector of state variables of the air charging system 195. As a consequence, it is possible to define a vector v of virtual inputs:

$$v = \begin{bmatrix} v_1 \\ v_2 \\ v_3 \\ v_4 \\ v_5 \end{bmatrix}$$

and use this virtual input vector v to develop a feedback linearization control algorithm u(x,v) according to the following matrix equation:

$$u(x,v) = Gg(x)^{-1} \cdot (v - f(x))$$

such that:

$$\dot{y} = v$$

Hence, also in this case the MIMO non-linear mathematical system has been transformed in an equivalent linear system, where each one of the virtual inputs $v_1$, $v_2$, $v_3$, $v_4$ and $v_5$ is related to only one of the output parameters $\dot{p}_i$, $\dot{\beta}_c$, $\dot{F}_i$, $\dot{F}_c$ and $\dot{\beta}_{ec}$ and vice versa, and where the relation between each one of the virtual inputs and the respective output parameter is a linear relation.

Taking advantage of this transformation, the ECU 450, in the processor 452, may be configured to control the intake valve actuator 332, the HP-EGR valve actuator 322, the VGT actuator 290, the LP-EGR valve actuator 522, and the electric motor 605 during the operation of the ICE 110, by the linear control procedure as illustrated in FIG. 9. This provides a coordinated control of the main actuators of the air charging system when the air charging system comprises two EGR pipes and thus two EGR valves individually disposed in those pipes.

This control procedure provides for the ECU 450, by the processor 452, to monitor (module S600), and receive data on, the value of the output parameters of the air charging system 195, namely the compression rate $\beta_c$, the intake manifold pressure $p_i$, the residual gas fraction $F_i$ in the intake manifold 200 and the residual gas fraction $F_c$, along with the value of the other observable state variables of the system and constants involved in the MIMO non-linear mathematical model above, namely the intake manifold inner volume $V_i$, the air temperature $T_i$ within the intake manifold 200, the exhaust gas pressure $p_x$ in the exhaust manifold, the HP-EGR correction coefficient $\xi_{egr\_HP}$, the exhaust gas temperature $T_x$ within the exhaust manifold 225, the volumetric efficiency $\eta_{v0}$ of the engine, the displacement $V_d$ of the engine, the engine speed $N_e$, the constant c, the specific heat capacity $c_p$ of a gas at constant pressure, the mass flow rate $W_c$ of the air/gas flow through the compressor 240 of the turbocharger 230, the mass flow rate $W_f$ of fuel injected into the combustion chambers 150 of the engine 110, the temperature $T_{c\_us}$ of the air/gas flow in the intake duct 205 upstream of the compressor 240, the compressor power rate $R_c$, the residual gas fraction $F_x$ within the exhaust manifold 225, the pressure $p_{c\_us}$ of the air/gas flow in the intake duct 205 upstream of the compressor 240, the volume $V_{c\_us}$ of the intake duct 205 upstream of the compressor 240, the LP-EGR correction coefficient $\xi_{egr\_LP}$, the pressure $p_{exh}$ of the exhaust gas in the exhaust pipe 275 downstream of the aftertreatment devices 280, the temperature $T_{egr\_LP}$ of the exhaust gas in the LP-EGR conduit 500, the air mass flow rate $W_a$ in the intake duct 205, the air temperature $T_{c\_ds}$ and the power rate $R_{ec}$ of the air compressor 260.

In this regard, the value of the compression rate $\beta_c$ may be determined as the ratio between the pressure in the duct upstream the throttle 331 and compressor upstream pressure $p_{c_{us}}$. The value of intake manifold pressure $p_i$ may be measured by the manifold pressure and temperature sensor 350 located in the intake manifold 200. The value of the intake manifold inner volume $V_i$ is a constant that depends on the geometry of the air charging system. The value of the residual gas fraction $F_i$ may be calculated as a function of the value of an oxygen concentration $O_2$ within the intake manifold 200, according to the equation $F_i = 1 - O_2$. The oxygen concentration value $O_2$ may be measured by a dedicated sensor disposed in the intake manifold 200 or may be estimated on the basis of other measurable operating parameters of the ICE 110. The value of the residual gas fraction $F_c$ may be determined as a function of the value of an oxygen concentration $O_{2c}$ at the intake duct 205 upstream the compressor 240, according to the equation $F = 1 - O_{2c}$. The compressor oxygen concentration $O_{2c}$ may be estimated on the basis of other measurable operating parameters in the intake duct 205 and in the LP pipe 500. The value of the intake manifold air temperature $T_i$ may be measured (downstream of the intercooler 260) by the manifold pressure and temperature sensor 350 located in the intake manifold 200. The value of the exhaust manifold pressure $p_x$ may be measured by a pressure sensor that may be disposed in the exhaust manifold 225 or in the exhaust pipe 275 upstream of the turbine 250. As an alternative, this pressure value may be estimated on the basis of other measurable operating parameters of the ICE 110, for example on the basis of the measurements made by the exhaust pressure and temperature sensors 430. The value of the HP-EGR correction coefficient $\xi_{egr_{HP}}$ is a nonlinear function of the pressure ratio across the HP-EGR valve. The value of the exhaust manifold gas temperature $T_x$ may be measured by a temperature sensor that may be disposed in the exhaust manifold 225 or in the exhaust pipe 275 upstream of the turbine 250. As an alternative, this temperature value may be estimated on the basis of other measurable operating parameters of the ICE 110, for example on the basis of the measurements made by the exhaust pressure and temperature sensors 430. The value of the volumetric efficiency $\eta_{v0}$ of the engine is a constant that depends on the geometry of the engine. The value of the displacement $V_d$ of the engine is a constant that depends on the geometry of the engine. The value of the engine speed $N_e$ may be measured by the crank position sensor 420. The value of c is a constant. The value of the specific heat capacity $c_p$ is a constant. The value of the mass flow rate $W_c$ of the air/gas flow through the compressor 240 of the turbocharger 230 may be determined as the sum of the air mass flow rate $W_a$ and the mass flow rate through the LP EGR. The value of the mass flow rate $W_f$ of fuel injected into the combustion chambers 150 of the engine 110 may be provided by the control strategies that operate the fuel injectors 160. The value of the temperature $T_{c_{us}}$ of the air/gas flow in the intake duct 205 upstream of the compressor 240 may be determined on the basis of other measurable operating parameters in the intake duct 205 and in the LP pipe 500. The value of the compressor power rate $R_c$ may be determined as a function of the mass flow rate $W_c$ of the air/gas flow through the compressor 240, of the compression rate $\beta_c$, of the pressure $p_{c_{us}}$, of the temperature $T_{c_{us}}$ and of the universal gas constant R. The value of the residual gas fraction $F_x$ at the exhaust manifold 225 may be measured by a lambda sensor located in the exhaust pipe 275, upstream of the aftertreatment devices 280. The value of the pressure $p_{c_{us}}$ of the air/gas flow in the intake duct 205 upstream of the compressor 240 may be estimated on the basis of other measurable operating parameters in the intake duct 205 and on the LP pipe 500. The value of the volume $V_{c_{us}}$ of intake duct upstream of the compressor 240 is a constant that depends on the geometry of the air charging system. The value of the LP-EGR correction coefficient $\xi_{egr_{LP}}$ is a non-linear function of the pressure ratio across the LP-EGR valve. The pressure $p_{exh}$ of the exhaust gas in the exhaust pipe 275 downstream of the aftertreatment devices 280 may be determined on the basis of other measurable operating parameters in the exhaust pipe 275. The value of the temperature $T_{egr_{LP}}$ of the exhaust gas in the LP-EGR conduit 500 may be measured by a dedicated sensor located in the duct upstream the LP EGR valve 521. The value of the air mass flow rate $W_a$ in the intake duct 205 may be calculated by the sensor 340. The air temperature $T_{c_{ds}}$ may be measured with a dedicated sensor or estimated. The power rate $R_{ec}$ can be calculated with the above-mentioned formula, wherein the air pressure $p_{c_{ds}}$ may be measured with a pressure sensor and $\beta_{ec}$ may be determined as the ratio between $p_{itv_{us}}$ and $p_{c_{ds}}$.

The monitored values of the output parameters $\beta_c$, $p_i$, $F_i$, $F_c$ and $\beta_{ec}$ are fed back and used to calculate an error (i.e. a difference) $e_1$, $e_2$, $e_3$, $e_4$ and $e_5$ between each one of them and a corresponding target value $p_{i\_tar}$, $F_{i\_tar}$, $\beta_{c\_tar}$, $F_{c\_tar}$ and $\beta_{ec\_tar}$ thereof:

$$e_1 = p_{i\_tar} - p_i$$

$$e_2 = \beta_{c\_tar} - \beta_c$$

$$e_3 = F_{i\_tar} - F_i$$

$$e_4 = F_{c\_tar} - F_c$$

$$e_5 = \beta_{ec\_tar} - \beta_{ec}$$

The target values $p_{i\_tar}$, $\beta_{c\_tar}$, $F_{i\_tar}$, $\beta_{ec\_tar}$ and $F_{c\_tar}$ for the output parameters may be determined by the ECU 450, by the processor 452, on the basis of other conventional strategies, for example on the basis of the engine operating point.

The first error $e_1$ is then applied as input to a first single-input single-output (SISO) linear controller S605 that yields as output a corresponding value for the first virtual input $v_1$. The second error $e_2$ is applied as input to a second SISO linear controller S610 that yields as output a corresponding value for the second virtual input $v_2$. The third error $e_3$ is applied as input to a third SISO linear controller S615 that yields as output a corresponding value for the third virtual input $v_3$. The fourth error $e_4$ is applied as input to a fourth SISO linear controller S620 that yields as output a corresponding value for the fourth virtual input $v_4$. The fifth error $e_5$ is applied as input to a fourth SISO linear controller S625 that yields as output a corresponding value for the fifth virtual input $v_5$.

The five linear controllers S605, S610, S615, S620 and S625 may be for example proportional-integral (PI) controllers or proportional-integral-derivative (PID) controllers, and are tuned over the equivalent linear system explained above, such as to minimize the respective errors $e_1$, $e_2$, $e_3$, $e_4$ and $e_5$.

The values of the virtual inputs $v_1$, $v_2$, $v_3$, $v_4$ and $v_5$ are then applied to a non-linear calculation module S630, where they are used to calculate corresponding values of the input parameters $W_{itv}$, $CdA_{egr\_HP}$, $CdA_{egr\_LP}$, $R_t$ and $P_e$ of the air charging system 195. In particular, the calculation module S630 may calculate these input parameters with the feedback linearization control algorithm that have been previously explained:

$$u = \begin{bmatrix} W_{itv} \\ CdA_{egr\_HP} \\ CdA_{egr\_LP} \\ R_t \\ P_e \end{bmatrix} = Gg(x)^{-1} \cdot (v - f(x))$$

The calculated value of the air mass flow rate $W_{itv}$ is then applied to a calculation module S635, which may use a mathematical model of the intake valve 330 to yield as output a position $U_{itv}$ of the actuator 332, which corresponds to the calculated value of the air mass flow rate $W_{itv}$. The calculated value of the flow effective area $CdA_{egr\_HP}$ is applied to another calculation module S640, which may use a mathematical model of the HP-EGR valve 320 to yield as output a position $U_{egr\_HP}$ of the actuator 322, which corresponds to the calculated value of the flow effective area $CdA_{egr\_HP}$. The calculated value of the flow effective area $CdA_{egr\_LP}$ is applied to still another calculation module S645, which may use a mathematical model of the LP-EGR valve 520 to yield as output a position $U_{egr\_LP}$ of the actuator 522, which corresponds to the calculated value of the flow effective area $CdA_{egr\_LP}$. The calculated value of the turbine power rate $R_t$ is applied to still another calculation module S650 of the turbine 250 to yield as output a position $U_{vgt}$ of the actuator 290, which corresponds to the calculated value of the turbine power rate $R_t$.

The air intake valve actuator 332, the HP-EGR valve actuator 322, the LP-EGR valve actuator 522 and the VGT actuator 290 are operated according to the respective calculated position $U_{itv}$, $U_{egr\_HP}$, $U_{egr\_LP}$ and $U_{vgt}$ while the electric motor 605 of the air compressor 600 is operated according to the calculated value $P_e$ of the electrical power (actuator operating module S655).

Figure 10:
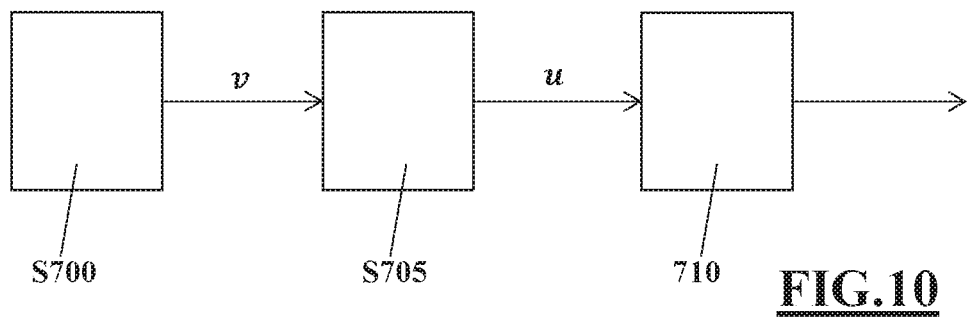
FIG. 10 is a flowchart representing the general control strategy which is actuated by all the examples above.

The examples described above demonstrate that the air charging system 195 may be controlled with a feedback linearization control strategy. As schematically represented in FIG. 10, this feedback linearization control strategy generally provides for the ECU 450, by the processor 452, to determine (block S700) a vector v containing a value of a plurality of virtual inputs, each of which is in linear relation with only one of the output parameters of the air charging system 195 contained in the vector y. The vector v is applied, by the processor, as input to a feedback linearization algorithm (block S705) as follows:

$$u(x,v) = Gg(x)^{-1} \cdot (v - Cf(x))$$

that provides as output a corresponding vector u of values of "actual" input parameters of the air charging system 195, each of which is then used (block S710) to operate a corresponding one of the actuators of the air charging system 195.

As explained in the examples above, during the operation of the internal combustion engine 110, the value of each virtual input may be determined with a dedicated single-input single-output (SISO) linear controller, according to a feedback control mechanism of the related output parameters of the air charging system. In this way, all the actuators of air charging system 195 are controlled together in a coordinate way, thereby improving the accuracy and the time response with which the air charging system 195 adheres to the target values of the output parameters thereof, such as during the transients. This provides simultaneous and coordinated control of the actuators while compensating for their interactions.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

What is claimed is:

1. A method of controlling the operation of an air charging system of an internal combustion engine, wherein the air charging system comprises, and wherein the method comprises:
   monitoring, by a plurality of sensors, a plurality of output parameters of the air charging system;
   calculating, by a processor, an error between each one of the output parameters and a target value thereof;
   applying, by the processor, each one of the calculated errors to a linear controller that yields a virtual input;
   calculating, by the processor, a plurality of input parameters for the air charging system using the virtual input with a non-linear mathematical model of the air charging system configured such that each one of the virtual inputs is in a linear relation with only one of the output parameters, wherein each one of the input parameters affects all of the output parameters; and
   operating a plurality of actuators of the air charging system including an electric motor of an air compressor, wherein each of the actuators using a corresponding one of the input parameters.

2. The method according to claim 1, wherein calculating the input parameters comprises calculating, by the processor, an input parameter for the electric motor and at least one of a first actuator for an air intake valve, a second actuator for an exhaust gas recirculation valve, and a third actuator for a variable-geometry turbocharger.

3. The method according to claim 2, wherein calculating the input parameters comprises calculating, by the processor, an input parameter for each of the first actuator for the air intake valve, the second actuator for the exhaust gas recirculation valve, and the third actuator for the variable-geometry turbocharger and the electric motor.

4. The method according to claim 3, wherein calculating the input parameters further comprises:
   calculating, by the processor, a first input parameter indicative of an air mass flow rate through the air intake valve;
   calculating, by the processor, a second input parameter indicative of an exhaust mass flow rate through the exhaust gas recirculation valve;
   calculating, by the processor, a third input parameter indicative of an exhaust mass flow rate through a turbine of the variable-geometry turbocharger; and
   calculating, by the processor, a fourth input parameter indicative of an electrical power provided to the electric motor.

5. The method according to claim 4, wherein the output parameters of the air charging system comprise a first output parameter indicative of an exhaust manifold pressure in an exhaust manifold, a second output parameter indicative of an intake manifold pressure in an intake manifold, a third output parameter indicative of a residual gas fraction in the intake manifold, and a fourth output parameter indicative of an air pressure downstream of the air compressor.

6. The method according to claim 3, wherein calculating the input parameters further comprises:
   calculating, by the processor, a first input parameter indicative of an air mass flow rate through the air intake valve;
   calculating, by the processor, a second input parameter indicative of a flow effective area of the exhaust gas recirculation valve;
   calculating, by the processor, a third input parameter indicative of a power rate of a turbine of the variable-geometry turbocharger; and
   calculating, by the processor, a fourth input parameter indicative of an electrical power provided to the electric motor of the air compressor.

7. The method according to claim 6, wherein the output parameters of the air charging system comprise a first output parameter indicative of an intake manifold pressure, a second output parameter indicative of a compression rate caused by a compressor of the variable-geometry turbocharger, a third output parameter indicative of a residual gas fraction in the intake manifold, and a fourth output parameter indicative of a compression rate caused by the air compressor.

8. The method according to claim 1, wherein calculating the input parameters comprises calculating, by the processor, an input parameter for each of a first actuator of an air intake valve, a second actuator of a first exhaust gas recirculation valve, a third actuator of a second exhaust gas recirculation valve, a fourth actuator of a variable-geometry turbocharger and the electric motor.

9. The method according to claim 8, wherein calculating the input parameters further comprises:
   calculating, by the processor, a first input parameter indicative of an air mass flow rate through the air intake valve;
   calculating, by the processor, a second input parameter indicative of a flow effective area of the first exhaust gas recirculation valve;
   calculating, by the processor, a third input parameter indicative of a flow effective area of the second exhaust gas recirculation valve;
   calculating, by the processor, fourth input parameter indicative of a power rate of a turbine of the variable-geometry turbocharger; and
   calculating, by the processor, a fifth input parameter indicative of an electrical power to be provided to the electric motor of the air compressor.

10. The method according to claim 9, wherein the output parameters of the air charging system comprise a first output parameter indicative of a pressure within an intake manifold, a second output parameter indicative of a residual gas fraction in the intake manifold, a third output parameter indicative of a compression rate caused by a compressor of the variable-geometry turbocharger, a fourth output parameter indicative of a residual gas fraction in an intake duct upstream of the compressor, and a fifth output parameter indicative of a compression rate caused by the air compressor.

11. The method according to claim 10, further comprising:
   processing each of the errors in a separate linear controller to yield a virtual input for each of the errors;

calculating, in a non-linear calculation module, the input parameters using the virtual inputs, wherein the input parameters are decoupled from one another;

applying the calculated first, second, third and fourth input parameters to a calculation module;

calculating a corresponding position value for each of the first, second, third and fourth actuators using a mathematical model of each of the air intake valve, the first exhaust gas recirculation valve, the second exhaust gas recirculation valve, and the turbine of the variable-geometry turbocharger;

operating each of the first, second, third and fourth actuators to achieve the corresponding position value; and operating the electric motor by supplying the electric power.

12. An air charging system of an internal combustion engine comprising:

a plurality of actuators including an electric motor of an air compressor; and an electronic control unit including a processor configured to:

monitor a plurality of output parameters of the air charging system, calculate an error between each one of the monitored output parameters and a target value thereof, apply each one of the calculated errors to a linear controller that yields a plurality of virtual inputs, use the virtual inputs to calculate a plurality of input parameters for the air charging system, wherein the input parameters are calculated using a non-linear mathematical model of the air charging system configured such that each virtual input is in a linear relation with only one of the plurality of output parameters, and use each of the input parameters to operate a corresponding one of the plurality of actuators of the air charging system.

13. The air charging system according to claim 12, wherein the plurality of actuators comprises:

a first actuator operating an air intake valve;

a second actuator operating a first exhaust gas recirculation valve;

a third actuator operating a second exhaust gas recirculation valve; and a fourth actuator operating a turbine of a variable-geometry turbocharger.

14. The air charging system according to claim 13, wherein the electronic controller comprises:

a set of linear controllers, one of which corresponds to each of the electric motor, the first actuator, the second actuator, the third actuator, and the fourth actuator, wherein each linear controller is configured to yield a virtual input;

a non-linear calculation module configured to calculate the input parameters; and a math model calculation module configured to calculate a corresponding position value for each of the first, second, third and fourth actuators using a mathematical model of each of the air intake valve, the first exhaust gas recirculation valve, the second exhaust gas recirculation valve, and the turbine of the variable-geometry turbocharger.

15. The air charging system according to claim 14, wherein the electronic controller further comprises an actuator operating module configured to receive the position values, and to receive the input parameter corresponding to the electric motor, and to operate the first second, third and fourth actuators and the electric motor based on the received position values and input parameter.

16. The air charging system according to claim 15 wherein the input parameter corresponding to the electric motor comprises an electric power value and is supplied to the actuator operating module without being processed through the math model calculation module.

* * * * *